(12) United States Patent
Zhu et al.

(10) Patent No.: US 11,425,634 B2
(45) Date of Patent: Aug. 23, 2022

(54) SLICE INFORMATION UPDATE METHOD AND APPARATUS

(71) Applicant: HUAWEI TECHNOLOGIES CO., LTD., Shenzhen (CN)

(72) Inventors: Fangyuan Zhu, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 16/905,383

(22) Filed: Jun. 18, 2020

(65) Prior Publication Data

US 2020/0322879 A1 Oct. 8, 2020

Related U.S. Application Data

(63) Continuation of application No. PCT/CN2018/120415, filed on Dec. 11, 2018.

(30) Foreign Application Priority Data

Dec. 20, 2017 (CN) .......................... 201711385748.8
Dec. 10, 2018 (CN) .......................... 201811505349.5

(51) Int. Cl.
*H04W 48/16* (2009.01)
*H04W 76/11* (2018.01)
(Continued)

(52) U.S. Cl.
CPC ............. *H04W 48/16* (2013.01); *H04W 8/12* (2013.01); *H04W 48/18* (2013.01); *H04W 60/00* (2013.01); *H04W 76/11* (2018.02)

(58) Field of Classification Search
CPC ....... H04W 48/16; H04W 76/11; H04W 8/12; H04W 48/18; H04W 60/00
(Continued)

(56) References Cited

U.S. PATENT DOCUMENTS 10,595,268 B2 * 3/2020 Lee ........................ H04W 16/02

FOREIGN PATENT DOCUMENTS

| CN | 106572516 A | 4/2017 |
| CN | 106982458 A | 7/2017 |
| CN | 107071799 A | 8/2017 |

OTHER PUBLICATIONS

"Ol#4i, Ol#4d/Ol#32: Tailoring UE support and removing NSSP terminology," SA WG2 Meeting #124, Reno, USA, S2-179566, pp. 1-14, 3rd Generation Partnership Project, Valbonne, France (Nov. 27-Dec. 1, 2017).
(Continued)

*Primary Examiner* — Chuck Huynh
(74) *Attorney, Agent, or Firm* — Leydig, Voit & Mayer, Ltd.

(57) ABSTRACT

This application provides a slice information update method and an apparatus. The method includes: when determining that a network slice that was not supported by a PLMN is updated to be supported by the PLMN, sending, by a network slice selection network element, a notification message to a communications network element, where the notification message is used to indicate that the PLMN supports the network slice; and notifying, by the communications network element, a terminal that the PLMN currently supports the network slice. In this way, the corresponding terminal learns that the PLMN currently supports the network slice.

12 Claims, 11 Drawing Sheets

(51) Int. Cl.
*H04W 8/12* (2009.01)
*H04W 48/18* (2009.01)
*H04W 60/00* (2009.01)

(58) Field of Classification Search
USPC .......................................................... 370/329
See application file for complete search history.

(56) References Cited

OTHER PUBLICATIONS

"23.501 Ol#4e: Clarification of slice availability in a PLMN," SA WG2 Meeting #124, Reno, USA, S2-178689, pp. 1-3, 3rd Generation Partnership Project, Valbonne, France (Nov. 27-Dec. 1, 2017).
"Handling updates to UE slicing configuration," 3GPP TSG-CT WG1 Meeting #107, Reno, USA, C1-174868, pp. 1-5, 3rd Generation Partnership Project, Valbonne, France (Nov. 27-Dec. 1, 2017).

* cited by examiner

SLICE INFORMATION UPDATE METHOD AND APPARATUS

CROSS-REFERENCE TO RELATED APPLICATIONS

This application is a continuation of International Application No. PCT/CN2018/120415, filed on Dec. 11, 2018, which claims priority to Chinese Patent Application No. 201711385748.8, filed on Dec. 20, 2017 and 201811505349.5, filed on Dec. 10, 2018. The disclosures of the aforementioned applications are hereby incorporated by reference in their entireties.

TECHNICAL FIELD

This application relates to the field of mobile communications technologies, and in particular, to a slice information update method and an apparatus.

BACKGROUND

When at least one network slice is deployed in a core network, and a terminal initially attaches to the network, a network slice selection process is triggered. The network side selects, for the terminal based on information such as a network slice requested by the terminal and subscription data of the terminal, a network slice allowed to be accessed.

After selecting, for the terminal, the network slice allowed to be accessed, the network side notifies the terminal of the selected network slice. If the network side determines that the subscription data of the terminal includes network slices that are not supported by a public land mobile network (PLMN), the network side further notifies the terminal of the network slices that are not supported by the PLMN.

In the foregoing scenario, when a network slice that is not supported by the PLMN is updated to be supported by the PLMN, there is no corresponding solution for how the network side notifies the terminal and which terminals are notified.

SUMMARY

This application provides a slice information update method and an apparatus, to notify a corresponding terminal when a network slice not supported by a PLMN is updated to be supported by the PLMN.

According to a first aspect a slice information update method is disclosed. The method includes: a communications network element receives a notification message from a network slice selection network element, where the notification message includes identification information of a network slice, the notification message is used to indicate that a PLMN supports the network slice, and the PLMN once did not support the network slice. Then, the communications network element notifies a terminal that the PLMN supports the network slice, where the terminal is a terminal that failed to request the network slice and has subscribed to the network slice. The communications network element is a mobility management network element or a policy control network element.

In the foregoing method, when determining that the network slice that was once not supported by the PLMN is updated to be supported by the PLMN, the network slice selection network element sends the notification message to the communications network element. The notification message is used to indicate that the PLMN supports the network slice. Then, the communications network element notifies the terminal that subscribed to the network slice and failed to request the network slice that the PLMN currently supports the network slice. In this way, the corresponding terminal is enabled to learn that the PLMN currently supports the network slice, and the terminal may use the network slice when having a service requirement corresponding to the network slice. This helps improve a service capability of the terminal.

In a possible implementation, the communications network element may determine the terminal based on a context of the terminal.

In a possible implementation, the communications network element is a mobility management network element. The method further includes: adding, by the mobility management network element, the identification information of the network slice to a set of allowed network slices of the terminal. In this case, that the communications network element notifies a terminal that the PLMN supports the network slice specifically includes: sending, by the mobility management network element, an updated set of allowed network slices to the terminal. Further, the mobility management network element sends the indication information to the terminal, where the indication information is used to indicate that the PLMN supports the network slice.

For example, in a specific implementation, the mobility management network element sends a configuration update message to the terminal, where the configuration update message includes the updated set of allowed network slices. Optionally, the configuration update message further includes the indication information.

In the foregoing method, the mobility management network element notifies, by using the updated set of allowed network slices, the terminal that the PLMN supports the network slice.

In another possible implementation, the communications network element is a policy control network element. The method further includes: determining, by the policy control network element, a mobility management network element with which the terminal registers. That the communications network element notifies a terminal that the PLMN supports the network slice specifically includes: sending, by the policy control network element, the indication information to the terminal by using the mobility management network element, where the indication information is used to indicate that the PLMN supports the network slice. Optionally, the policy control network element further receives the identification information of the network slice, identification information of the mobility management network element, and identification information of the terminal that are sent by the mobility management network element.

In the foregoing implementation, the policy control network element sends the indication information to the terminal, to indicate that the PLMN supports the network slice.

According to a second aspect, a slice information update method is disclosed. The method includes: receiving, by a mobility management network element, an update message from a policy control network element, where the update message includes indication information and identification information of a terminal, the indication information is used to indicate that a public land mobile network (PLMN) supports a network slice, and the PLMN once did not support the network slice. Then, the mobility management network element notifies the terminal that the PLMN supports the network slice, where the terminal is a terminal that failed to request the network slice and has subscribed to the network slice.

In the foregoing method, when the mobility management network element receives the notification message from the policy control network element, where the notification message is used to indicate that the PLMN supports the network slice, the mobility management network element sends, to the terminal indicated in the notification message, a notification that the PLMN currently supports the network slice. In this way, the corresponding terminal is enabled to learn that the PLMN currently supports the network slice, and the terminal can use the network slice when having a service requirement corresponding to the network slice. This helps improve a service capability of the terminal.

In a possible implementation, the method further includes: adding, by the mobility management network element, identification information of the network slice to a set of allowed network slices of the terminal. That the mobility management network element notifies the terminal that the PLMN supports the network slice specifically includes: sending, by the mobility management network element, an updated set of allowed network slices to the terminal. Optionally, the mobility management network element further sends the indication information to the terminal, where the indication information is used to indicate that the PLMN supports the network slice.

For example, in a specific implementation, the mobility management network element sends a configuration update message to the terminal, where the configuration update message includes the updated set of allowed network slices. Optionally, the configuration update message further includes the indication information.

In the foregoing method, the mobility management network element notifies, by using the updated set of allowed network slices, the terminal that the PLMN supports the network slice.

In a possible implementation, that the mobility management network element notifies the terminal that the PLMN supports the network slice specifically includes: sending, by the mobility management network element, a NAS message to the terminal, where the NAS message includes indication information.

In a possible implementation, the method further includes: sending, by the mobility management network element, identification information of the terminal, identification information of the mobility management network element, and the identification information of the network slice to the policy control network element.

According to a third aspect, a slice information update method is disclosed. The method includes: receiving, by a policy control network element, identification information of a terminal and identification information of a network slice that are from a mobility management network element, where the network slice is a network slice that is not supported in a current registration area of the terminal. Then, the policy control network element obtains, from a network slice selection network element, a service area corresponding to the network slice. If learning that the terminal moves to the service area, the policy control network element notifies the terminal that the network slice is available.

In the foregoing method, responsive to determining that the terminal moves to the service area corresponding to the network slice, the policy control network element notifies the terminal that the network slice is currently available. The network slice is a network slice that is not supported in an area in which the terminal is located before the terminal moves to the service area corresponding to the network slice. In this way, the corresponding terminal is notified that the network slice is currently available, and the terminal can use the network slice when having a service requirement corresponding to the network slice. This helps improve a service capability of the terminal.

In a possible implementation, the method further includes: sending, by the policy control network element, to the mobility management network element, a subscription that, when a location of the terminal is updated, causes the mobility management network element to send an updated location of the terminal to the policy control network element.

In a possible implementation, that the policy control network element notifies the terminal that the network slice is currently available specifically includes: sending, by the policy control network element, the indication information to the terminal by using the mobility management network element, where the indication information is used to indicate that the network slice is available.

According to a fourth aspect, a slice information update method is disclosed. The method includes: determining, by a network slice selection network element, that a PLMN supports a network slice, where the PLMN once did not support the network slice. The method further includes sending, by the network slice selection network element, a notification message to a communications network element, where the notification message includes identification information of the network slice, and the notification message is used to indicate that the PLMN supports the network slice. The communications network element is a policy control network element or a mobility management network element.

In the foregoing method, responsive to determining that the network slice that was once not supported by the PLMN is updated to be supported by the PLMN, the network slice selection network element sends the notification message to the communications network element. The notification message is used to indicate that the PLMN supports the network slice. Then, the communications network element may notify the terminal that subscribed to the network slice and failed to request the network slice that the PLMN currently supports the network slice. In this way, the corresponding terminal is enabled to learn that the PLMN currently supports the network slice, and the terminal can use the network slice when having a service requirement corresponding to the network slice. This helps improve a service capability of the terminal.

In a possible implementation, the method further includes: receiving, by the network slice selection network element from the communications network element, a subscription that, when the PLMN supports the network slice, causes the network slice selection network element to notify the communications network element.

In a possible implementation, the method further includes: determining, by the network slice selection network element based on a slice type supported by the mobility management network element in the PLMN, that the mobility management network element supporting the network slice is the communications network element needing to send the notification message.

According to a fifth aspect, a slice information update method is disclosed. The method includes: receiving, by a mobility management network element, a notification message from a network slice selection network element, where the notification message includes identification information of a network slice and identification information of at least one tracking area, the network slice is available in the at least one tracking area, and the network slice was once unavailable in the at least one tracking area. The mobility management network element determines an updated set of allowed network slices, where the updated set of allowed network slices includes the identification information of the network slice, and a terminal is located in a registration area of the terminal and can access the network slice. The mobility management network element sends the updated set of allowed network slices to the terminal.

That the terminal can access the network slice means that the network slice is available in any tracking area in the registration area of the terminal.

In the foregoing method, responsive to determining that the network slice changes from unavailable to available in the at least one tracking area, the network slice selection network element sends the notification message to the mobility management network element. The notification message includes the identification information of the network slice and the identification information of the at least one tracking area. Then, the mobility management network element determines the updated set of allowed network slices, where the updated set of allowed network slices includes the identification information of the network slice; and the mobility management network element sends the updated set of allowed network slices to the terminal. In this way, the corresponding terminal is enabled to learn that the terminal currently can access the network slice, and the terminal can use the network slice when having a service requirement corresponding to the network slice. This helps improve a service capability of the terminal.

In a possible implementation, responsive to determining that the network slice is available in the registration area of the terminal, the mobility management network element determines that the terminal can access the network slice.

In a possible implementation, before receiving the notification message from the network slice selection network element, the mobility management network element further stores a set of rejected network slices of the terminal, where the set of rejected network slices includes the identification information of the network slice.

In a possible implementation, before sending the updated set of allowed network slices to the terminal, the mobility management network element further receives a registration request message from the terminal, where the registration request message includes the identification information of the network slice.

In a possible implementation, that the mobility management network element sends the updated set of allowed network slices to the terminal specifically includes: sending, by the mobility management network element, a registration accept message to the terminal, where the registration accept message includes the updated set of allowed network slices.

According to a sixth aspect, a slice information update method is disclosed. The method includes: receiving, by a terminal and from a mobility management network element, a set of allowed network slices and a set of rejected network slices that are of the terminal, where the set of rejected network slices includes identification information of a network slice, and the terminal is located in a registration area of the terminal. The terminal sends a registration request message to the mobility management network element, where the registration request message includes the identification information of the network slice. The terminal receives an updated set of allowed network slices from the mobility management network element, where the updated set of allowed network slices includes the identification information of the network slice, the network slice is available in the registration area of the terminal, and the network slice was once unavailable in the registration area of the terminal.

In the foregoing method, the terminal may add, to the registration request message, the identification information of the network slice that the terminal was rejected to access. If determining that the terminal currently supports the network slice, the mobility management network element adds the identification information of the network slice to the updated set of allowed network slices, and sends the updated set of allowed network slices to the terminal, so that the terminal can subsequently use the network slice. In this way, the corresponding terminal is enabled to learn that the terminal currently can access the network slice, and the terminal can use the network slice when having a service requirement corresponding to the network slice. This helps improve a service capability of the terminal.

In a possible implementation, that the terminal receives an updated set of allowed network slices from the mobility management network element specifically includes: receiving, by the terminal, a registration accept message from the mobility management network element, where the registration accept message includes the updated set of allowed network slices.

According to a seventh aspect, an apparatus is disclosed. The apparatus may be a communications network element, or may be a chip, and the communications network element may be a mobility management network element or a policy control network element. The apparatus has functions of implementing various embodiments of the first aspect. The functions may be implemented by hardware, or may be implemented by hardware executing corresponding software. The hardware or the software includes one or more modules corresponding to the foregoing functions.

According to an eighth aspect, an apparatus is disclosed. The apparatus includes a processor and a memory. The memory is configured to store computer-executable instructions. When the apparatus runs, the processor executes the computer-executable instructions stored in the memory, to enable the apparatus to perform any slice information update method in the first aspect.

According to a ninth aspect, an apparatus is disclosed. The apparatus may be a mobility management network element, or may be a chip. The apparatus has functions of implementing various embodiments of the second aspect. The functions may be implemented by hardware, or may be implemented by hardware executing corresponding software. The hardware or the software includes one or more modules corresponding to the foregoing functions.

According to a tenth aspect, an apparatus is disclosed. The apparatus includes a processor and a memory. The memory is configured to store computer-executable instructions. When the apparatus runs, the processor executes the computer-executable instructions stored in the memory, to enable the apparatus to perform any slice information update method in the second aspect.

According to an eleventh aspect, an apparatus is disclosed. The apparatus may be a policy control network element, or may be a chip. The apparatus has functions of implementing various embodiments of the third aspect. The functions may be implemented by hardware, or may be implemented by hardware executing corresponding software. The hardware or the software includes one or more modules corresponding to the foregoing functions.

According to a twelfth aspect, an apparatus is disclosed. The apparatus includes a processor and a memory. The memory is configured to store computer-executable instructions. When the apparatus runs, the processor executes the computer-executable instructions stored in the memory, to enable the apparatus to perform any slice information update method in the third aspect.

According to a thirteenth aspect, an apparatus is disclosed. The apparatus may be a network slice selection network element, or may be a chip. The apparatus has functions of implementing various embodiments of the fourth aspect. The functions may be implemented by hardware, or may be implemented by hardware executing corresponding software. The hardware or the software includes one or more modules corresponding to the foregoing functions.

According to a fourteenth aspect, an apparatus is disclosed. The apparatus includes a processor and a memory. The memory is configured to store computer-executable instructions. When the apparatus runs, the processor executes the computer-executable instructions stored in the memory, to enable the apparatus to perform any slice information update method in the fourth aspect.

According to a fifteenth aspect, an apparatus is disclosed. The apparatus may be a mobility management network element, or may be a chip. The apparatus has functions for implementing various embodiments of the fifth aspect. The functions may be implemented by hardware, or may be implemented by hardware executing corresponding software. The hardware or the software includes one or more modules corresponding to the foregoing functions.

According to a sixteenth aspect, an apparatus is disclosed. The apparatus includes a processor and a memory. The memory is configured to store computer-executable instructions. When the apparatus runs, the processor executes the computer-executable instructions stored in the memory, to enable the apparatus to perform any slice information update method in the fifth aspect.

According to a seventeenth aspect, an apparatus is disclosed. The apparatus may be a terminal, or may be a chip. The apparatus has functions for implementing various embodiments of the sixth aspect. The functions may be implemented by hardware, or may be implemented by hardware executing corresponding software. The hardware or the software includes one or more modules corresponding to the foregoing functions.

According to an eighteenth aspect, an apparatus is disclosed. The apparatus includes a processor and a memory. The memory is configured to store a computer-executable instruction. When the apparatus runs, the processor executes the computer-executable instruction stored in the memory, to enable the apparatus to perform any slice information update method in the sixth aspect.

According to a nineteenth aspect, a computer-readable storage medium is disclosed. The computer-readable storage medium stores instructions, and when the instructions are run on a computer, the computer is enabled to perform the method according to each of the foregoing aspects.

According to a twentieth aspect, this application further provides a computer program product including instructions. When the computer program product runs on a computer, the computer is enabled to perform the method according to each of the foregoing aspects.

According to a twenty-first aspect, a system is disclosed. The system includes the apparatus according to the seventh aspect or the eighth aspect, and the apparatus according to the thirteenth aspect or the fourteenth aspect.

According to a twenty-second aspect, a system is disclosed. The system includes the apparatus according to the ninth aspect or the tenth aspect, and the apparatus according to the thirteenth aspect or the fourteenth aspect.

According to a twenty-third aspect, a system is disclosed. The system includes the apparatus according to the fifteenth aspect or the sixteenth aspect, and the apparatus according to the seventeenth aspect or the eighteenth aspect.

DESCRIPTION OF EMBODIMENTS

To make the objectives, technical solutions, and advantages of this application clearer, the following further describes various embodiments in detail with reference to the accompanying drawings. A specific operation method in a method embodiment may also be applied to an apparatus embodiment or a system embodiment. In the descriptions of the following embodiments, unless otherwise stated, "a plurality of" means two or more than two.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: with evolution of the network architecture and emergence of new service scenarios, the technical solutions provided in the embodiments of this application are also applicable to similar technical problems.

Figure 1:
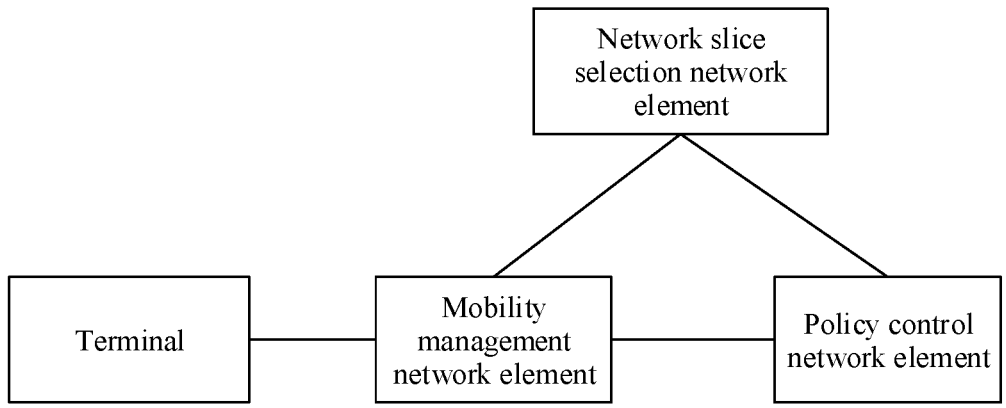
FIG. 1 is a schematic diagram of a network architecture, in accordance with some embodiments.

FIG. 1 is a schematic diagram of a network architecture in accordance with some embodiments. The network architecture includes a terminal, a mobility management network element, a policy control network element, and a network slice selection network element. The mobility management network element and the policy control network element each may be referred to as a communications network element. In other words, in this application, the communications network element is a mobility management network element or a policy control network element.

The terminal is a device having a wireless transceiver function, may be deployed on land, and includes an indoor device, an outdoor device, a handheld device, or a vehicle-mounted device; or may be deployed on a water surface (such as on a ship); or may be deployed in air (such as in an aircraft, a balloon, and a satellite). The terminal may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in smart grid, a wireless terminal in transportation safety, a wireless terminal in smart city, a wireless terminal in smart home, or the like.

The mobility management network element is responsible for mobility management of a user, including mobility status management, temporary user identity allocation, and user authentication and authorization.

The policy control network element has a subscriber subscription data management function, a policy control function, a charging policy control function, quality of service (QoS) control, and the like.

The network slice selection network element is responsible for determining a network slice instance, selecting a mobility management network element, and the like.

It may be understood that the foregoing functions may be network elements in a hardware device, software functions running on dedicated hardware, or virtualized functions instantiated on a platform (e.g., a cloud platform).

It should be noted that the mobility management network element may be referred to as an access and mobility management function (AMF) network element in 5G. The policy control network element may be referred to as a policy control function (PCF) network element in 5G. The network slice selection network element may be referred to as a network slice selection function (NSSF) network element in 5G. Certainly, in future communication, for example, in 6G, the mobility management network element may still be referred to as an AMF network element or have another name, the policy control network element may still be referred to as a PCF network element or have another name, and the network slice selection network element may still be referred to as an NSSF network element or have another name. This is not limited in this application.

For ease of description, is the following embodiments may be subsequently described by using an example in which the mobility management network element is referred to as an AMF network element, the policy control network element is referred to as a PCF network element, and the network slice selection network element is referred to as an NSSF network element. Further, the AMF network element is referred to as an AMF for short, the PCF network element is referred to as a PCF for short, and the NSSF network element is referred to as an NSSF for short. In other words, in the subsequent descriptions of this application, the AMF may be replaced with a mobility management network element, the PCF may be replaced with a policy control network element, and the NSSF may be replaced with a network slice selection network element.

Figure 2:
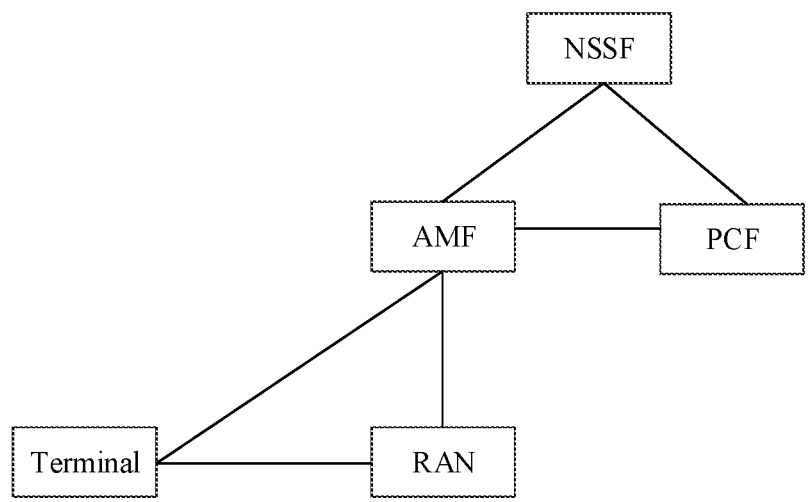
FIG. 2 is a schematic diagram of a specific system architecture, in accordance with some embodiments.

FIG. 2 is a schematic diagram of a specific system architecture based on the network architecture shown in FIG. 1. The system architecture includes a terminal, a radio access network (radio access network) device, and a control plane network element of a core network. The control plane network element of the core network includes an AMF, a PCF, and an NSSF.

For descriptions of functions of the terminal, the AMF, the PCF, and the NSSF, refer to the foregoing descriptions. Details are not described herein again.

The radio access network (RAN) device is a device that provides a wireless communication function for the terminal. The RAN device includes but is not limited to: a next generation NodeB (gNB), an evolved nodeB (eNB), a radio network controller (RNC), a NodeB (NB), a base station controller (BSC), a base transceiver station (BTS), a home base station (e.g., a home evolved nodeB or a home node B, HNB), a baseband unit (BBU), a transmission reception point (TRP), a transmitting point (TP), a mobile switching center, and the like in 5G.

In this application, the RAN device may be configured to forward a non-access stratum (NAS) message for communication between the terminal and the AMF.

The following specifically describes, with reference to FIG. 1 and FIG. 2, the slice information update provided in this application, to resolve the problem mentioned in the background. It should be noted that the various embodiments are not limited to the architectures shown in FIG. 1 and FIG. 2, and may further be applied to another future communications system such as a 6G system architecture. In addition, names of the foregoing network elements that are used herein may change while functions of the network elements may remain the same in a future communications system.

Before the foregoing embodiments are described in detail, a related background of a technical problem to be resolved in this application is first briefly described.

Currently, various scenarios have different requirements on a 3rd generation partnership project (3GPP) ecosystem, for example, requirements on charging, policy, security, and mobility. The 3GPP emphasizes that network slices do not affect each other. For example, a large quantity of burst meter reading services should not affect normal mobile broadband services. To meet diversified requirements and isolation between slices, independent management and O&M are required between services, and customized service functions and analysis capabilities are provided. Instances of different service types are deployed on different network slices, and instances of a same service type may also be deployed on different network slices.

When at least one network slice is deployed in a core network, and a user initially attaches to (or "registers with") the network, a network slice selection process is triggered. The slice selection process depends on subscription data of the user, local configuration information, a roaming agreement, an operator policy, and the like. In the network slice selection process, the foregoing parameters need to be comprehensively considered to select an optimal slice type for a terminal.

When the terminal needs to access a network slice, the terminal may provide the requested network slice to the core network, so that the core network selects a network slice instance for the terminal. The network slice requested by the terminal may be represented by requested network slice selection assistance information (NSSAI). The requested NSSAI includes one or more pieces of single network slice selection assistance information (S-NSSAI). Each piece of S-NSSAI is used to identify a network slice type, and may alternatively be understood as that the S-NSSAI is used to identify a network slice, or may be understood as that the S-NSSAI is identification information of a network slice.

Before the terminal registers with and accesses the network, pre-configured NSSAI is locally stored. Both S-NSSAI included in the configured NSSAI and S-NSSAI included in NSSAI subscribed to by the terminal are S-NSSAI defined in an PLMN. In a possible implementation, the S-NSSAI included in the configured NSSAI is a subset or a complete set of the S-NSSAI included in the NSSAI subscribed to by the terminal. For example, the NSSAI subscribed to by the terminal is {S-NSSAI 1, S-NSSAI 2, S-NSSAI 3, S-NSSAI 4, S-NSSAI 5}. In this case, the configured NSSAI is a subset or a complete set of {S-NSSAI 1, S-NSSAI 2, S-NSSAI 3, S-NSSAI 4, S-NSSAI 5}.

When initially registering with and accessing the network, the terminal carries requested NSSAI. The requested NSSAI is a subset or a complete set of the S-NSSAI included in the configured NSSAI. For example, the configured NSSAI is {S-NSSAI 1, S-NSSAI 2, S-NSSAI 3, S-NSSAI 4}. In this case, the requested NSSAI is a subset or a complete set of {S-NSSAI 1, S-NSSAI 2, S-NSSAI 3, S-NSSAI 4}.

After the terminal registers with the network, a core network element (e.g., the AMF or the NSSF) performs comprehensive determining based on information such as subscription data of the terminal, the requested NSSAI of the terminal, the roaming protocol, and a local configuration, and selects a set of allowed network slices for the terminal. The set of allowed network slices may be represented by allowed NSSAI. S-NSSAI included in the allowed NSSAI is a subset or a complete set of the S-NSSAI included in the NSSAI subscribed to by the terminal. Alternatively, the allowed NSSAI is a subset or a complete set of the S-NSSAI included in the requested NSSAI. Then, the core network element sends the allowed NSSAI to the terminal, for example, adds the allowed NSSAI to a registration accept message, and sends the registration accept message to the terminal. When subsequently needing to initiate a service request, the terminal may select S-NSSAI from the allowed NSSAI to initiate a service.

Further, when sending the allowed NSSAI to the terminal, the core network element further returns, to the terminal, rejected NSSAI and a cause for rejecting each piece of S-NSSAI in the rejected NSSAI. An example is used below for description.

It is assumed that subscribed NSSAI of the terminal is {S-NSSAI 1, S-NSSAI 2, S-NSSAI 3, S-NSSAI 4}, and the terminal is currently located in a service scope of an AMF set 1.

Figure 3:
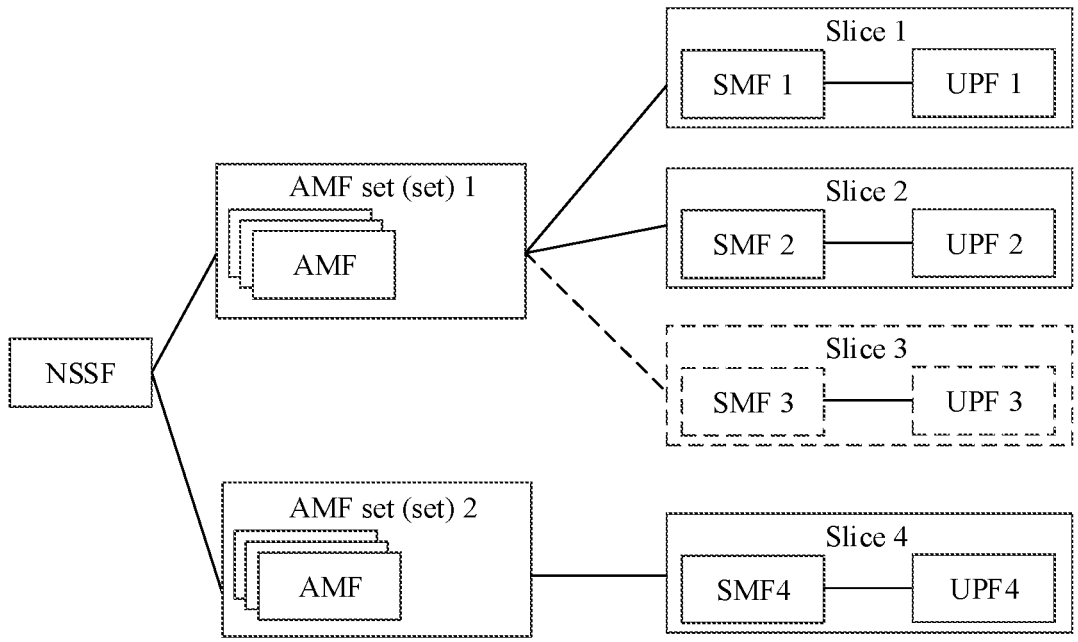
FIG. 3 is a schematic diagram of a first application scenario, in accordance with some embodiments.
Figure 4:
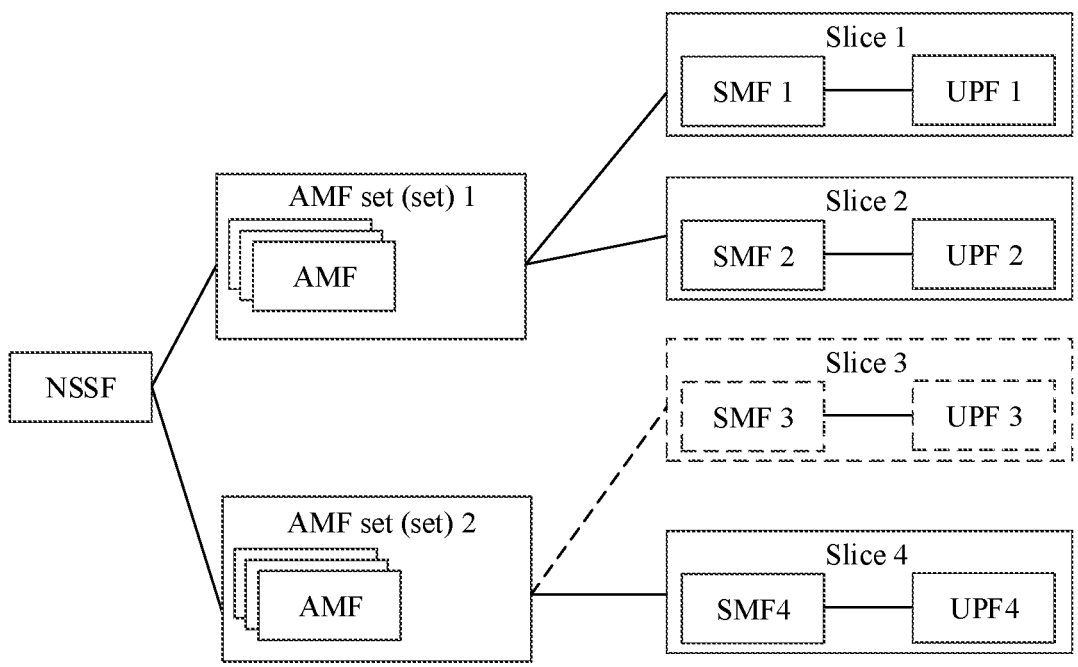
FIG. 4 is a schematic diagram of a second application scenario, in accordance with some embodiments.

The following provides descriptions in two application scenarios with reference to FIG. 3 and FIG. 4.

It should be noted that the slice mentioned in this application is sometimes referred to as a network slice. The slice and the network slice refer to same content and have a same meaning, and may be replaced with each other. This is not particularly described subsequently.

FIG. 3 is a schematic diagram of a first application scenario, in accordance with some embodiments. A network side includes two AMF sets (set): an AMF set 1 and an AMF set 2. Network slices (slicing) supported by any AMF in the AMF set 1 are {slice 1, slice 2}, and a network slice supported by any AMF in the AMF set 2 is {slice 4}. In addition, the network further includes a slice 3 that is temporarily not supported by a PLMN, and a cause why the slice 3 is temporarily not supported by the PLMN is that the slice 3 is not deployed, is disabled temporarily, or the like.

If the slice 3 is subsequently updated to be supported by the PLMN, that is, updated to be available, the slice 3 belongs to the AMF set 1.

The slice 1, the slice 2, the slice 3, and the slice 4 may be respectively identified by S-NSSAI 1, S-NSSAI 2, S-NSSAI 3, and S-NSSAI 4. In other words, the S-NSSAI 1 is identification information of the slice 1, the S-NSSAI 2 is identification information of the slice 2, the S-NSSAI 3 is identification information of the slice 3, and the S-NSSAI 4 is identification information of the slice 4.

Each network slice corresponds to one or more session management function (Session Management Function, SMF) network elements and one or more user plane function (User Plane Function, UPF) network elements. For example, as shown in FIG. 3, the slice 1 corresponds to an SMF 1 and a UPF 1, the slice 2 corresponds to an SMF 2 and a UPF 2, the slice 3 corresponds to an SMF 3 and a UPF 3, and the slice 4 corresponds to an SMF 4 and a UPF 4.

In the example shown in FIG. 3, it is assumed that after the terminal registers with the network, an AMF currently accessed by the terminal (where the AMF is also referred to as an AMF that serves the terminal) is an AMF in the AMF set 1. In this case, slices that can be used by the AMF that serves the terminal are the slice 1 and the slice 2.

For the slice 3, the slice 3 may be referred to as a network slice not supported by the PLMN, or referred to as a network slice temporarily not supported by the PLMN, or referred to as a network slice currently not supported by the PLMN. When the slice 3 is updated to be supported by the PLMN, the slice 3 may also be used by the AMF that serves the terminal.

For the slice 4, if a current registration area (register area, RA) (where the registration area is a coverage area of the AMF that serves the terminal) of the terminal does not include any AMF in the AMF set 2, the slice 4 may be referred to as a network slice that is not supported in the current registration area of the terminal. This may also be understood as that the terminal cannot use the slice 4 at a current location. The terminal can use the slice 4 only when the terminal moves to an area that can be served by the slice 4. For example, when the terminal moves to coverage of an AMF in the AMF set 2, provided that the terminal registers with the AMF, the terminal can use the slice 4, to be specific, can use the slice 4 to initiate a service procedure.

In the example shown in FIG. 3, the slice 4 is isolated from the slice 1, the slice 2, and the slice 3. This may also be understood as that when using the slice 4, the terminal cannot use the slice 1, the slice 2, or the slice 3; and when using the slice 1, the slice 2, or the slice 3, the terminal cannot use the slice 4.

In the example shown in FIG. 3, although the slice 3 cannot be used in the PLMN, because the slice 1, the slice 2, and the slice 3 all belong to the AMF set 1, the slice 3 is not isolated from the slice 1 and the slice 2.

For the scenario shown in FIG. 3, because the NSSAI subscribed to by the terminal is {S-NSSAI 1, S-NSSAI 2, S-NSSAI 3, S-NSSAI 4}, and the terminal is currently located within the service scope of the AMF set 1, the requested NSSAI carried when the terminal registers with and accesses the network is {S-NSSAI 1, S-NSSAI 2, S-NSSAI 3, S-NSSAI 4}, the slice 3 identified by the S-NSSAI 3 is a network slice not supported by the PLMN, and the slice 4 identified by the S-NSSAI 4 is a network slice that is not supported in the current registration area of the terminal. In this case, information sent by the core network element (e.g., the NSSF or the AMF) to the terminal is as follows:

allowed NSSAI: {S-NSSAI 1, S-NSSAI 2}; and rejected NSSAI: {S-NSSAI 3 with a cause value 1, S-NSSAI 4 with a cause value 2}.

The allowed NSSAI includes identification information of the allowed network slices of the core network side. To be specific, the core network side allows the terminal to access the slice 1 and the slice 2.

The rejected NSSAI includes identification information of rejected network slices of the core network side. To be specific, the core network side rejects access of the terminal to the slice 3 and the slice 4. In addition, the cause value for rejecting access of the terminal to the slice 3 is 1, and the cause value for rejecting access of the terminal to the slice 4 is 2. The cause value 1 indicates that the slice is not supported by the PLMN, and the cause value 2 indicates that the slice is not supported in the current registration area of the terminal.

Further, the core network element may send an isolation rule (or referred to as a coexistence rule) to the terminal: The S-NSSAI 1, the S-NSSAI 2, and the S-NSSAI 3 are isolated from the S-NSSAI 4 (which is alternatively referred to as non-coexistence).

Certainly, the coexistence rule may alternatively be pre-configured on the terminal. This is not limited in this application. For example, if the coexistence rule is preconfigured on the terminal, the terminal may learn, according to the coexistence rule, that the NSSAI 1, the S-NSSAI 2, and the S-NSSAI 3 are isolated from the S-NSSAI 4 (which is alternatively referred to as non-coexistence). In this case, while requesting the NSSAI 1, the S-NSSAI 2, and the S-NSSAI 3, the terminal does not request the S-NSSAI 4 at the same time. Based on the scenario in FIG. 3, there is another possible implementation: The NSSAI subscribed to by the terminal is {S-NSSAI 1, S-NSSAI 2, S-NSSAI 3, S-NSSAI 4}, and the terminal is currently located in the service scope of the AMF set 1. If the requested NSSAI carried when the terminal registers with and accesses the network is {S-NSSAI 1, S-NSSAI 2, S-NSSAI 3}, information sent by the core network element (e.g., the NSSF or the AMF) to the terminal is as follows:

rejected NSSAI: {S-NSSAI 3 with a cause value 1}.

The rejected NSSAI includes identification information of the rejected network slice of the core network side. To be specific, the core network side rejects access of the terminal to the slice 3. The cause value 1 indicates that the slice is not supported by the PLMN.

The foregoing descriptions are a specific implementation provided only for ease of description. Certainly, during actual application, the present disclosure is not limited to the foregoing implementation, and may alternatively be implemented in another manner.

FIG. 4 is a schematic diagram of a second application scenario, in accordance with some embodiments. A main difference between this embodiment and the embodiment shown in FIG. 3 lies in that the slice 3 not supported by the PLMN belongs to the AMF set 2. Therefore, in this embodiment, the slice 1 and the slice 2 are isolated from the slice 4. To be specific, when using the slice 1 or the slice 2, the terminal cannot use the slice 4; and when using the slice 4, the terminal cannot use the slice 1 or the slice 2.

When the slice 3 is updated to be supported by the PLMN, the slice 1 and the slice 2 are isolated from the slice 3 and the slice 4. To be specific, when using the slice 1 or the slice 2, the terminal cannot use the slice 3 or the slice 4; and when using the slice 3 or the slice 4, the terminal cannot use the slice 1 or the slice 2.

For the embodiment shown in FIG. 4, because the NSSAI subscribed to by the terminal is {S-NSSAI 1, S-NSSAI 2, S-NSSAI 3, S-NSSAI 4}, and the terminal is currently located within the service scope of the AMF set 1, the requested NSSAI carried when the terminal registers with and accesses the network is {S-NSSAI 1, S-NSSAI 2, S-NSSAI 3, S-NSSAI 4}, the slice 3 identified by the S-NSSAI 3 is a network slice not supported by the PLMN, and the slice 4 identified by the S-NSSAI 4 is a network slice that is not supported in the current registration area of the terminal. In this case, information sent by the core network element (e.g., the NSSF or the AMF) to the terminal is as follows:

allowed NSSAI: {S-NSSAI 1, S-NSSAI 2}; and rejected NSSAI: {S-NSSAI 3 with a cause value 1, S-NSSAI 4 with a cause value 2}.

The allowed NSSAI includes identification information of the allowed network slices of the core network side. To be specific, the core network side allows the terminal to access the slice 1 and the slice 2.

The rejected NSSAI includes identification information of rejected network slices of the core network side. To be specific, the core network side rejects access of the terminal to the slice 3 and the slice 4. In addition, the cause value for rejecting access of the terminal to the slice 3 is 1, and the cause value for rejecting access of the terminal to the slice 4 is 2. The cause value 1 indicates that the slice is not supported by the PLMN, and the cause value 2 indicates that the slice is not supported in the current registration area of the terminal.

Further, the core network element may send an isolation rule (or referred to as a coexistence rule) to the terminal: The S-NSSAI 1 and the S-NSSAI 2 are isolated from the S-NSSAI 3 and the S-NSSAI 4 (which is alternatively referred to as non-coexistence).

The foregoing descriptions are a specific implementation provided only for ease of description. Certainly, during actual application, the present disclosure is not limited to the foregoing implementation, and may alternatively be implemented in another manner.

For the application scenarios in FIG. 3 and FIG. 4, when a network slice (e.g., the slice 3 in FIG. 3 or the slice 3 in FIG. 4) that is not supported by the PLMN is updated to be supported by the PLMN, or when a network slice (e.g., the slice 4 in FIG. 3 or the slice 4 in FIG. 4) that is not supported in the current registration area of the terminal is updated to be available (where for example, a new registration area in which the terminal is currently located supports use of the slice 4 due to movement of the terminal), the present disclosure is intended to resolve the following problems of how the core network side needs to notify the terminal and which terminals are notified.

To resolve different problems in the foregoing different scenarios, this application provides a plurality of slice information update methods, which are separately described in detail below.

Figure 5:
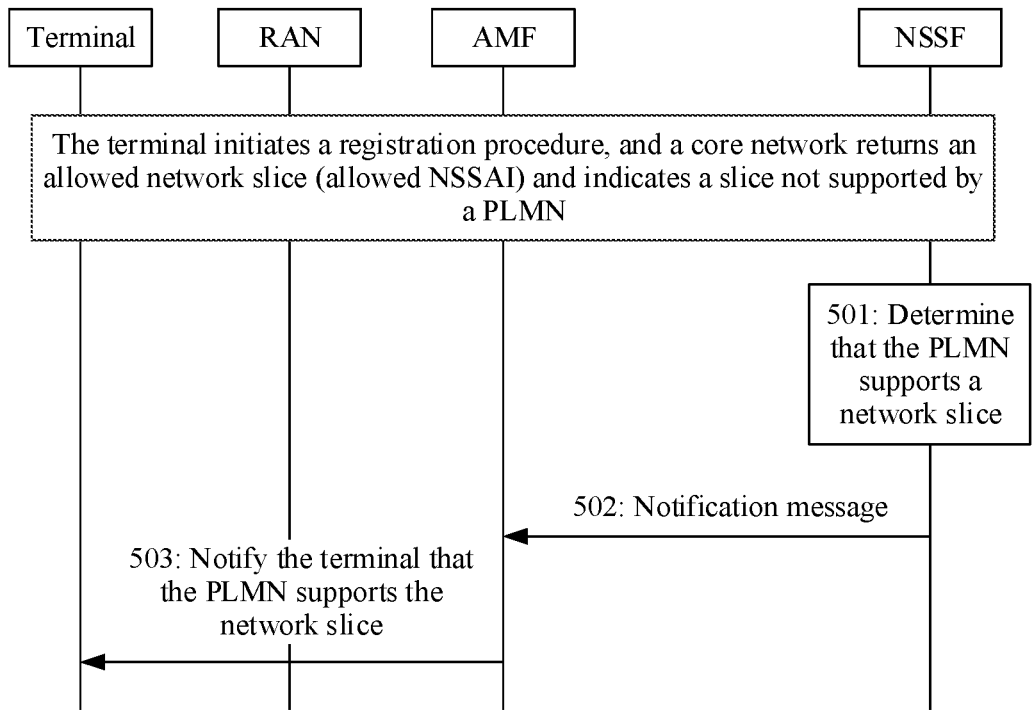
FIG. 5 is a schematic diagram of a slice information update method, in accordance with some embodiments.

FIG. 5 is a schematic diagram of a slice information update method, in accordance with some embodiments. For example, the method may be used to resolve the problems of how a core network side notifies a terminal and which terminals are notified when the slice 3 that is not supported by the PLMN and that is shown in FIG. 3 is updated to be supported by the PLMN.

As shown in FIG. 5, before step 501, the terminal initiates a registration procedure, and the core network side returns allowed NSSAI and rejected NSSAI. The rejected NSSAI includes identification information (e.g., the S-NSSAI 3) of a slice (e.g., the slice 3 in FIG. 3) and a rejection cause value, and the rejection cause value indicates that the slice is a network slice not supported by the PLMN.

An AMF (namely, an AMF that serves the terminal) with which the terminal currently registers is an AMF in an AMF set (e.g., the AMF set 1 in FIG. 3). Information stored in the terminal includes the allowed NSSAI, the rejected NSSAI (including the S-NSSAI 3), and the rejection cause value. Information stored in the AMF that serves the terminal includes requested NSSAI of the terminal and NSSAI subscribed to by the terminal.

Herein, it should be noted that, for the example shown in FIG. 3, actually, the rejected NSSAI returned by the core network side may further include the identification information (e.g., the S-NSSAI 4) of the slice 4 and the rejection cause value, and the rejection cause value indicates that the slice is a network slice that is not supported in the current registration area of the terminal. For ease of description, in the embodiment shown in FIG. 5, description is provided only when the slice 3 indicated by the S-NSSAI 3 in the rejected NSSAI is updated to be available in the PLMN. For a specific implementation method in which the slice 4 indicated by the S-NSSAI 4 in the rejected NSSAI is updated to be available in the current registration area of the terminal, refer to related descriptions of the embodiment subsequently shown in FIG. 8.

In the network, there are one or more terminals described above. Therefore, if a slice that is not supported by the PLMN is subsequently updated to be supported by the PLMN, the terminals that requested the network slice but were rejected should be notified.

The slice information update method shown in FIG. 5 includes the following steps.

Step 501: An NSSF determines that the PLMN supports a network slice.

For example, the NSSF may learn, from a network management system (operation, administration and maintenance, OAM), that a network slice originally not supported by the PLMN is updated to be supported by the PLMN. For example, the NSSF learns, from the network management system, that the slice 3 in FIG. 3 is updated from being not supported by the PLMN to being supported by the PLMN. In a possible implementation, an operator deploys, at a moment, a network resource corresponding to the slice 3. For example, the network resource may include an SMF network element, a UPF network element, and the like corresponding to the slice 3. The network management system sends a notification message to the NSSF. The notification message includes the identification information and indication information that are of the slice 3, where the indication information indicates that the slice 3 is updated from being not supported by the PLMN to being supported by the PLMN. Therefore, the NSSF learns, from the network management system, that the slice 3 is updated from being not supported by the PLMN to being supported by the PLMN.

Step 502: The NSSF sends a notification message to the AMF, and the AMF receives the notification message from the NSSF.

In this step, the NSSF needs to send the notification message to a specific AMF. The notification message includes the identification information of the network slice that is determined in step 501, and the notification message is used to indicate that the PLMN supports the network slice. The PLMN once did not support the network slice. For example, the notification message includes the S-NSSAI 3, and is used to indicate that the PLMN currently supports the slice 3.

An AMF to which the notification message needs to be sent may be determined according to any one of the following methods. In other words, an AMF to which the notification message needs to be sent is determined.

Method 1: The NSSF determines, based on a slice type supported by the AMF in the PLMN, that the AMF supporting the network slice is the AMF to which the notification message needs to be sent.

For example, referring to FIG. 3, the method is used. Because all AMFs in the AMF set 1 support the slice 3, the NSSF determines that the AMF to which the notification message needs to be sent includes an AMF in the AMF set 1. In other words, the NSSF determines that the NSSF needs to send the notification message to an AMF (e.g., all the AMFs) in the AMF set 1. Certainly, in an implementation, the NSSF may alternatively determine that the AMF to which the notification message needs to be sent includes some AMFs in the AMF set 1.

Certainly, if a slice type supported by another AMF includes the slice 3, the NSSF determines that the AMF to which the notification message needs to be sent further includes the AMF.

Method 2: The NSSF determines that an AMF that subscribed to the network slice from the NSSF is the AMF to which the notification message needs to be sent.

The AMF that subscribed to the network slice from the NSSF means that the AMF subscribes to a notification from the NSSF: When the PLMN supports the network slice, the NSSF notifies the AMF. The network slice is a network slice that was once not supported by the PLMN but currently has been updated to be supported by the PLMN, for example, the slice 3 in FIG. 3.

In a possible implementation, when the AMF that serves the terminal determines, in the registration procedure of the terminal, that the core network rejects a request of the terminal for a network slice that is not supported by the PLMN, the AMF subscribes to the notification from the NSSF: When the PLMN supports the network slice, the NSSF notifies the AMF. For example, the AMF that serves the terminal may subscribe to the notification from the NSSF before step 501. For example, the AMF that serves the terminal sends a subscription request message to the NSSF. The subscription request message includes an identifier of the AMF and the identification information of the network slice, where the terminal requested to use the network slice but the core network rejected the request. Alternatively, by sending identification information of the AMF and the identification information of the network slice to the NSSF, the AMF that serves the terminal invokes a subscription service: When the PLMN supports the network slice, the NSSF notifies the AMF. When determining that the network slice that was once not supported by the PLMN is updated to be supported by the PLMN, the NSSF determines that the AMF that sent the subscription request message to the NSSF or that invoked the subscription service is the AMF to which the notification message needs to be sent.

According to the method 1 or the method 2, the NSSF may determine the AMF to which the notification message needs to be sent. For example, if the method 1 is used, the determined AMF to which the notification message needs to be sent includes the AMF supporting the network slice. If the method 2 is used, the determined AMF to which the notification message needs to be sent includes the AMF that subscribed to a status of the network slice from the NSSF.

Step 503: The AMF notifies the terminal that the PLMN supports the network slice.

The AMF in step 503 is the AMF that receives the notification message in step 502.

The terminal that needs to be notified by the AMF includes a terminal that failed to request the network slice and has subscribed to the network slice. For example, the AMF may determine, based on a context of the terminal that is stored in the AMF, the terminal that needs to be notified.

For example, if a terminal added the identification information of the network slice to the requested NSSAI, NSSAI subscribed to by the terminal includes the identification information of the network slice, and the PLMN did not support the network slice when the terminal requested to use the network slice, the core network rejected the request of the terminal for the network slice. Therefore, when the network slice is updated from being not supported by the PLMN to being supported by the PLMN, the AMF that serves the terminal needs to notify the terminal that the PLMN supports the network slice.

In a specific implementation, the AMF may notify the terminal in the following manner:

The AMF adds the identification information of the network slice to a set of allowed network slices of the terminal, namely, the allowed NSSAI, and then sends updated allowed NSSAI to the terminal.

For example, for the example shown in FIG. 3, allowed NSSAI previously sent by the AMF to the terminal is {S-NSSAI 1, S-NSSAI 2}, and rejected NSSAI sent to the terminal includes the S-NSSAI 3. In this case, when the AMF needs to notify the terminal that the slice 3 identified by the S-NSSAI 3 has been updated to be available, the AMF may generate updated allowed NSSAI, including {S-NSSAI 1, S-NSSAI 2, S-NSSAI 3}, and then send the updated allowed NSSAI to the terminal. For example, the updated allowed NSSAI may be added to a configuration update message of the terminal, and the configuration update message is sent to the terminal. After receiving the configuration update message, the terminal obtains the updated allowed NSSAI from the configuration update message, so that the terminal may learn that the slice 3 has been updated from being not supported by the PLMN to being supported by the PLMN. Therefore, the terminal may subsequently use the slice 3 to initiate a service request procedure.

In an implementation, the AMF may immediately send the updated allowed NSSAI to the terminal. For example, after determining the updated allowed NSSAI based on local configuration information, the AMF may send the updated allowed NSSAI to a corresponding terminal. Optionally, when sending the updated allowed NSSAI to the terminal, the AMF further sends indication information to the terminal. The indication information is used to indicate that the PLMN supports the network slice. The indication information may be generated by the AMF, or may be generated by the NSSF and sent to the AMF by using the notification message in step 502.

In another implementation, the AMF may alternatively not send the updated allowed NSSAI to the terminal immediately. For example, the AMF first stores the updated allowed NSSAI based on local configuration information, and then waits and sends the updated allowed NSSAI to the terminal in a registration update procedure after the terminal proactively initiates the registration update procedure.

In the foregoing embodiment, when the NSSF determines that the network slice that was once not supported by the PLMN is updated to be supported by the PLMN, the NSSF first determines the AMF, and then sends the notification message to the determined AMF. The notification message is used to indicate that the PLMN supports the network slice. Then, the AMF that receives the notification message notifies the terminal that registers with the AMF and that requested the network slice but was rejected: The PLMN currently supports the network slice. In this way, when a network slice that was once not supported by the PLMN is updated to be supported by the PLMN, a corresponding terminal is notified by using a corresponding AMF. Therefore, the terminal can use the network slice when having a service requirement corresponding to the network slice. This helps improve a service capability of the terminal.

Figure 6:
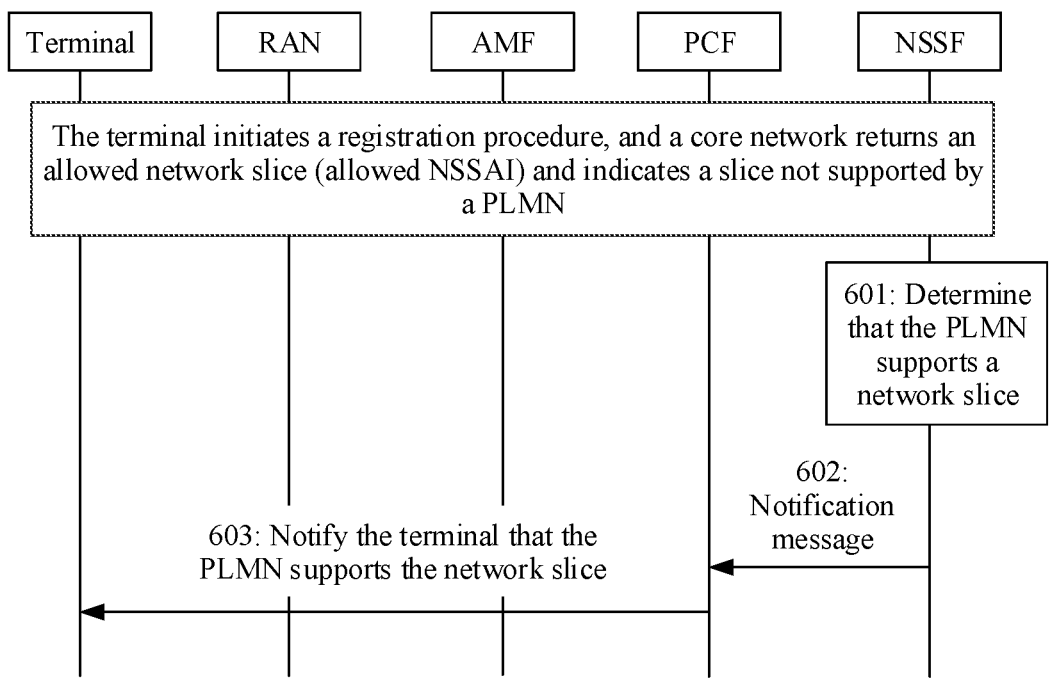
FIG. 6 is a schematic diagram of another slice information update method, in accordance with some embodiments.

FIG. 6 is a schematic diagram of another slice information update method, in accordance with some embodiments. For example, the method may be used to resolve the problems of how a core network side notifies a terminal and which terminals are notified when the slice 3 that is not supported by the PLMN and that is shown in FIG. 3 is updated to be supported by the PLMN.

As shown in FIG. 6, before step 601, the terminal initiates a registration procedure, and the core network side returns allowed NSSAI and rejected NSSAI. The rejected NSSAI includes identification information (e.g., the S-NSSAI 3) of a slice (e.g., the slice 3 in FIG. 3) and a rejection cause value, and the rejection cause value indicates that the slice is a network slice not supported by the PLMN.

An AMF (namely, an AMF that serves the terminal) with which the terminal currently registers is an AMF in an AMF set (e.g., the AMF set 1 in FIG. 3). Information stored in the terminal includes the allowed NSSAI, the rejected NSSAI (including the S-NSSAI 3), and the rejection cause value. Information stored in the AMF that serves the terminal includes requested NSSAI of the terminal and NSSAI subscribed to by the terminal.

Herein, it should be noted that, for the example shown in FIG. 3, actually, the rejected NSSAI returned by the core network side may further include the identification information (e.g., the S-NSSAI 4) of the slice 4 and the rejection cause value, and the rejection cause value indicates that the slice is a network slice that is not supported in the current registration area of the terminal. For ease of description, in the embodiment shown in FIG. 6, description is provided only when the slice 3 indicated by the S-NSSAI 3 in the rejected NSSAI is updated to be available in the PLMN. For a specific implementation method in which the slice 4 indicated by the S-NSSAI 4 in the rejected NSSAI is updated to be available in the current registration area of the terminal, refer to related descriptions of the embodiment subsequently shown in FIG. 8.

In the network, there are one or more terminals described above. Therefore, if a slice that is not supported by the PLMN is subsequently updated to be supported by the PLMN, the terminals that requested the network slice but were rejected should be notified.

The slice information update method shown in FIG. 6 includes the following steps.

Step 601: An NSSF determines that the PLMN supports a network slice.

A specific implementation of step 601 is the same as that of step 501. Refer to the foregoing descriptions.

Step 602: The NSSF sends a notification message to a PCF, and the PCF receives the notification message from the NSSF.

In this step, the NSSF needs to send the notification message to a specific PCF. The notification message includes the identification information of the network slice that is determined in step 601, and the notification message is used to indicate that the PLMN supports the network slice. The PLMN once did not support the network slice. For example, the notification message includes the S-NSSAI 3, and is used to indicate that the PLMN supports the slice 3.

In an implementation, a PCF to which the notification message needs to be sent may be determined in the following manner: The NSSF determines that a PCF that subscribed to the network slice from the NSSF is the PCF to which the notification message needs to be sent, that is, determines a PCF to which the notification message needs to be sent.

If the PCF to which the notification message is sent is determined in this manner, before step 601, the method further includes the following steps.

Step A: The AMF sends the notification message to the PCF, and the PCF receives the notification message from the AMF.

In a possible implementation, when the AMF that serves the terminal determines, in the registration procedure of the terminal, that the core network rejects a request of the terminal for a network slice that is not supported by the PLMN, the AMF sends the notification message to a PCF to which the AMF belongs. The notification message is used to trigger the PCF to subscribe to a status of the network slice from the NSSF. The notification message includes identification information of the terminal, identification information of the AMF, and identification information of the network slice. Then, the PCF stores an association relationship among the identification information of the terminal, the identification information of the AMF, and the identification information of the network slice.

Step B: The PCF subscribes to a notification from the NSSF: When the PLMN supports the network slice, the NSSF notifies the PCF.

In an implementation, the PCF may send a subscription request message to the NSSF. The subscription request message includes an identifier of the PCF and the identification information of the network slice, where the terminal requested to use the network slice but the core network rejected the request. Alternatively, by sending identification information of the PCF and the identification information of the network slice to the NSSF, the PCF invokes a subscription service: When the PLMN supports the network slice, the NSSF notifies the PCF. When determining that the network slice that was once not supported by the PLMN is updated to be supported by the PLMN, the NSSF determines that the PCF that sent the subscription request message to the NSSF or that invoked the subscription service is the PCF to which the notification message needs to be sent.

Step 603: The PCF notifies the terminal that the PLMN supports the network slice.

The PCF in step 603 is the PCF that receives the notification message from the NSSF in step 602.

The terminal that needs to be notified by the PCF includes a terminal that failed to request the network slice and has subscribed to the network slice.

In an implementation, the PCF may send indication information to the terminal by using the AMF, where the indication information is used to indicate that the PLMN supports the network slice. In other words, step 603 may be replaced with the following step 603a and step 603b.

Step 603a: The PCF sends an update message to the AMF, and the AMF receives the update message from the PCF.

The update message includes the indication information and the identification information of the terminal. The indication information is used to indicate that the PLMN supports the network slice. The PLMN once did not support the network slice.

The PCF first determines, based on a context of the terminal that is stored in the PCF, the terminal that needs to be notified and the AMF with which the terminal registers. For example, in the example of performing step A and step B, when the PCF receives the notification message from the AMF, the notification message includes the identification information of the terminal, the identification information of the AMF, and the identification information of the network slice. In this case, the PCF may store the association relationship among the identification information of the terminal, the identification information of the AMF, and identification information of the network slice. Therefore, the PCF may determine, based on the stored association relationship, the identification information of the terminal that needs to be included in the update message in step 603a, and determine the AMF to which the update message needs to be sent in step 603a.

For example, after step A and step B are performed for a plurality of times, the PCF stores information shown in Table 1.

TABLE 1

| Identification information of the terminal | Identification information of the AMF | Identification information of the network slice |
| --- | --- | --- |
| Terminal 1 | AMF 1 | S-NSSAI 3 |
| Terminal 2 | AMF 1 | S-NSSAI 3 |
| Terminal 3 | AMF 2 | S-NSSAI 3 |

In Table 1, the terminal 1 and the terminal 2 register with the AMF 1, the terminal 3 registers with the AMF 2. In addition, both the AMF 1 and the AMF 2 are AMFs in the AMF set 1 shown in FIG. 3. The terminal 1 to the terminal 3 in Table 1 are terminals that are recorded by the PCF and that requested the slice 3 identified by the S-NSSAI 3 but were rejected.

For example, the foregoing step A and step B are performed for three times. It is assumed that both the AMF 1 and the AMF 2 are managed by a PCF 1.

First Time:

Step A: The AMF 1 sends a notification message to the PCF 1, where the notification message includes (the terminal 1, the AMF 1, and the S-NSSAI 3).

Step B: The PCF subscribes to a notification from the NSSF: When the PLMN supports the slice 3 identified by the S-NSSAI 3, the NSSF notifies the PCF 1.

When subscribing to the notification from the NSSF, the PCF 1 further sends identification information of the PCF 1 and the S-NSSAI 3 to the NSSF.

Second Time:

Step A: The AMF 1 sends a notification message to the PCF 1, where the notification message includes the terminal 2, the AMF 1, and the S-NSSAI 3.

Step B: The PCF subscribes to a notification from the NSSF: When the PLMN supports the slice 3 identified by the S-NSSAI 3, the NSSF notifies the PCF 1.

When subscribing to the notification from the NSSF, the PCF 1 further sends identification information of the PCF 1 and the S-NSSAI 3 to the NSSF.

Third Time:

Step A: The AMF 2 sends a notification message to the PCF 1, where the notification message includes the terminal 3, the AMF 2, and the S-NSSAI 3.

Step B: The PCF subscribes to a notification from the NSSF: When the PLMN supports the slice 3 identified by the S-NSSAI 3, the NSSF notifies the PCF 1.

When subscribing to the notification from the NSSF, the PCF 1 further sends identification information of the PCF 1 and the S-NSSAI 3 to the NSSF.

Certainly, because steps B in the operations performed for three times are the same, during specific implementation, step B may be performed once only in the operations performed for the first time, and step B is not performed in the operations performed for the second time and the third time.

Step 603b: The AMF notifies the terminal that the PLMN supports the network slice, where the terminal is a terminal that failed to request the network slice and has subscribed to the network slice.

The AMF is the AMF that receives the update message from the PCF in step 603a, and the terminal is the terminal indicated by the identification information of the terminal that is carried in the update message in step 603a.

Table 1 is still used as an example, and step 603b needs to be performed for three times.

First time: The AMF 1 notifies the terminal 1 that the PLMN supports the slice 3 identified by the S-NSSAI 3.

Second time: The AMF 1 notifies the terminal 2 that the PLMN supports the slice 3 identified by the S-NSSAI 3.

Third time: The AMF 2 notifies the terminal 3 that the PLMN supports the slice 3 identified by the S-NSSAI 3.

In a specific implementation, the AMF may notify the terminal in the following manner. In other words, notification in the first time, the second time, and the third time may be implemented in the following manner:

The AMF adds the identification information of the network slice to a set of allowed network slices of the terminal, namely, the allowed NSSAI, and then sends updated allowed NSSAI to the terminal. For specific implementation details of the implementation, refer to related descriptions in step 503 in the embodiment shown in FIG. 5. Details are not described herein again.

In the foregoing embodiment, when the NSSF determines that the network slice that was once not supported by the PLMN is updated to be supported by the PLMN, the NSSF first determines the PCF, and then sends the notification message to the determined PCF. The notification message is used to indicate that the PLMN supports the network slice. Then, the PCF that receives the notification message notifies the terminal that requested the network slice but was rejected: The PLMN currently supports the network slice. In this way, when a network slice that was once not supported by the PLMN is updated to be supported by the PLMN, a corresponding terminal is notified by using a corresponding PCF. Therefore, the terminal can use the network slice when having a service requirement corresponding to the network slice. This helps improve a service capability of the terminal.

Figure 7:
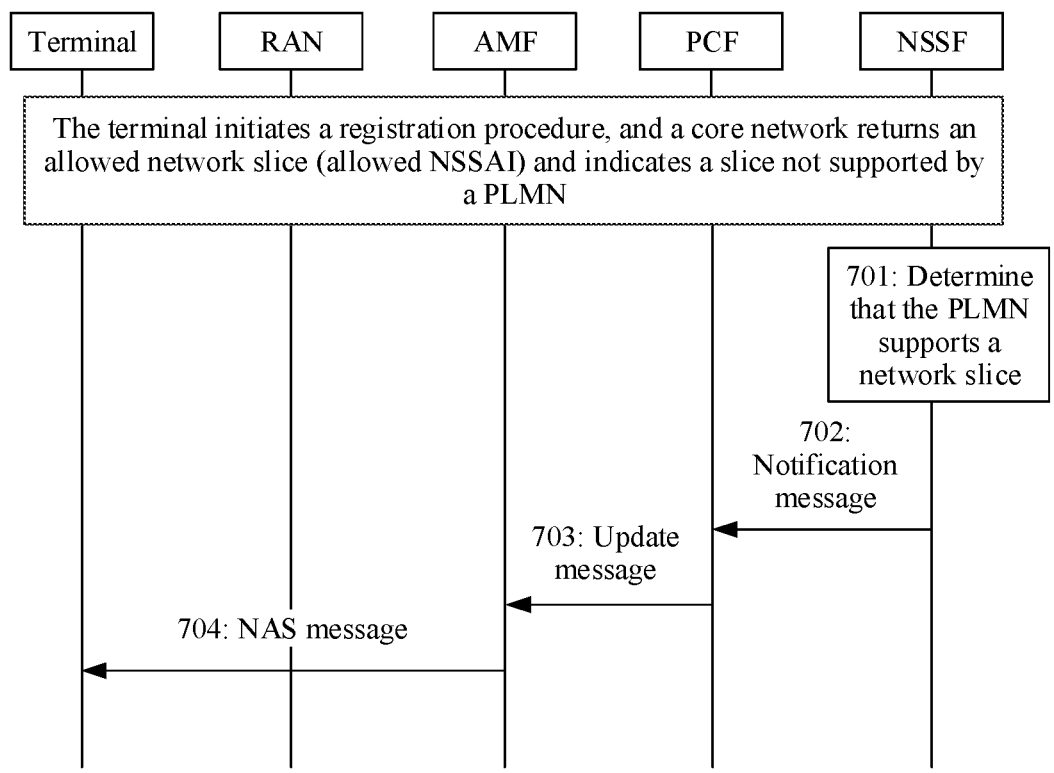
FIG. 7 is a schematic diagram of another slice information update method, in accordance with some embodiments.

FIG. 7 is a schematic diagram of another slice information update method, in accordance with some embodiments. For example, the method may be used to resolve the problems of how a core network side notifies a terminal and which terminals are notified when the slice 3 that is not supported by the PLMN and that is shown in FIG. 4 is updated to be supported by the PLMN.

In the scenario shown in FIG. 4, an isolation rule (or referred to as a coexistence rule) is that the slice 1 and the slice 2 are isolated from the slice 3 and the slice 4, or is referred to as non-coexistence. Alternatively, this may be understood as that an AMF (namely, an AMF in the AMF set 1) to which the slice 1 and the slice 2 belong does not coexist with an AMF (namely, an AMF in the AMF set 2) to which the slice 3 and the slice 4 belong. The coexistence rule may be returned by a network to a terminal that when the terminal registers with the network, or the coexistence rule may be configured on a terminal.

As shown in FIG. 7, before step 701, the terminal initiates a registration procedure, and the core network side returns allowed NSSAI and rejected NSSAI. The rejected NSSAI includes identification information (e.g., the S-NSSAI 3) of a slice (e.g., the slice 3) and a rejection cause value, and the rejection cause value indicates that the slice is a network slice not supported by the PLMN. Optionally, the coexistence rule is further sent to the terminal. The coexistence rule is that the S-NSSAI 1 and the S-NSSAI 2 do not coexist with the S-NSSAI 3 and the S-NSSAI 4 (in other words, the slice 1 and the slice 2 do not coexist with the slice 3 and the slice 4).

An AMF (namely, an AMF that serves the terminal) with which the terminal currently registers is an AMF in an AMF set (e.g., the AMF set 1 in FIG. 4). Information stored in the terminal includes the allowed NSSAI, the rejected NSSAI (including the S-NSSAI 3), the rejection cause value, and the coexistence rule. Information stored in the AMF that serves the terminal includes requested NSSAI of the terminal and NSSAI subscribed to by the terminal.

Herein, it should be noted that, for the example shown in FIG. 4, actually, the rejected NSSAI returned by the core network side may further include the identification information (e.g., the S-NSSAI 4) of the slice 4 and the rejection cause value, and the rejection cause value indicates that the slice is a network slice that is not supported in the current registration area of the terminal. For ease of description, in the embodiment shown in FIG. 7, description is provided only when the slice 3 indicated by the S-NSSAI 3 in the rejected NSSAI is updated to be available in the PLMN. For a specific implementation method in which the slice 4 indicated by the S-NSSAI 4 in the rejected NSSAI is updated to be available in the current registration area of the terminal, refer to related descriptions of the embodiment subsequently shown in FIG. 8.

In the network, there are one or more terminals described above. Therefore, if a slice that is not supported by the PLMN is subsequently updated to be supported by the PLMN, the terminals that requested the network slice but were rejected should be notified.

The slice information update method shown in FIG. 7 includes the following steps.

Step 701: An NSSF determines that the PLMN supports a network slice.

A specific implementation of step 701 is the same as that of step 601. Refer to the foregoing descriptions.

Step 702: The NSSF sends a notification message to a PCF, and the PCF receives the notification message from the NSSF.

A specific implementation of step 702 is the same as that of step 602. Refer to the foregoing descriptions.

Step 703: The PCF sends an update message to the AMF, and the AMF receives the update message from the PCF.

The update message may be, for example, a policy update message. The update message includes the indication information and the identification information of the terminal. The indication information is used to indicate that the PLMN supports the network slice. The PLMN once did not support the network slice.

A specific implementation of step 703 is the same as the implementation of step 603a. Refer to the foregoing descriptions.

Step 704: The AMF sends a NAS message to the terminal, and the terminal receives the NAS message from the AMF.

The terminal is the terminal indicated by the identification information of the terminal that is carried in the update message in step 703.

The NAS message includes the identification information of the network slice, and the network slice is a network slice that was once not supported by the PLMN and that is updated to be supported by the PLMN. Optionally, the NAS message further includes the indication information, where the indication information is used to indicate that the network slice is available. Alternatively, this is understood as that the indication information is used to indicate that the network slice has been updated to be supported by the PLMN.

If Table 1 is still used as an example, step 703 needs to be performed for three times.

First time: The AMF 1 notifies the terminal 1 that the PLMN supports the slice 3 identified by the S-NSSAI 3.

Second time: The AMF 1 notifies the terminal 2 that the PLMN supports the slice 3 identified by the S-NSSAI 3.

Third time: The AMF 2 notifies the terminal 3 that the PLMN supports the slice 3 identified by the S-NSSAI 3.

For example, the AMF notifies the terminal in the following manner. In other words, notification in the first time, the second time, and the third time may be implemented in the following manner: The AMF sends the NAS message to the terminal. The NAS message includes the indication information, and the indication information is used to indicate that the PLMN supports the slice 3 identified by the S-NSSAI 3.

A main difference between step 704 and step 603*b* lies in that the AMF that serves the terminal does not need to send the updated allowed NSSAI to the terminal, and only needs to notify the terminal that the network slice has been updated to be supported by the PLMN. This is because the AMF that serves the terminal is isolated from the AMF to which the network slice belongs (in other words, the AMF 1 and the AMF 2 are isolated from the AMF to which the slice 3 belongs). Therefore, the AMF that serves the terminal does not have a capability of supporting the network slice. The example in Table 1 is used as an example. Because both the AMF 1 and the AMF 2 belong to the AMF set 1, the AMF 1 and the AMF 2 support only the slice 1 and the slice 2. However, in step 703, the AMF 1 needs to notify the terminal 1 and the terminal 2 that the slice 3 identified by the S-NSSAI 3 is updated to be supported by the PLMN. Because the AMF 1 does not support the slice 3, the AMF 1 cannot send updated allowed NSSAI {S-NSSAI 1, S-NSSAI 2, S-NSSAI 3} to the terminal 1 and the terminal 2, but can only send one piece of indication information to the terminal 1 and the terminal 2, to indicate that the slice 3 identified by the S-NSSAI 3 has been updated to be supported by the PLMN. Therefore, information stored by the terminal 1 and the terminal 2 is as follows:

allowed NSSAI: {S-NSSAI 1, S-NSSAI 2}; and
the slice 3 identified by the S-NSSAI 3 is available.

Similarly, the AMF 2 also needs to send the indication information to the terminal 3. Therefore, information stored by the terminal 3 is:

allowed NSSAI: {S-NSSAI 1, S-NSSAI 2}; and
the slice 3 identified by the S-NSSAI 3 is available.

In the foregoing embodiment, when the NSSF determines that the network slice that was once not supported by the PLMN is updated to be supported by the PLMN, the NSSF first determines the PCF, and then sends the notification message to the determined PCF, to indicate that the PLMN supports the network slice. Then, the PCF that receives the notification message sends the update message to the AMF. The update message includes the identification information of the terminal and the indication information. Then, the AMF sends the indication information to the terminal indicated by the notification message, to notify the terminal that the network slice has been updated to be supported by the PLMN. Therefore, the terminal may use the network slice when having a service requirement corresponding to the network slice. This helps improve a service capability of the terminal.

Figure 8:
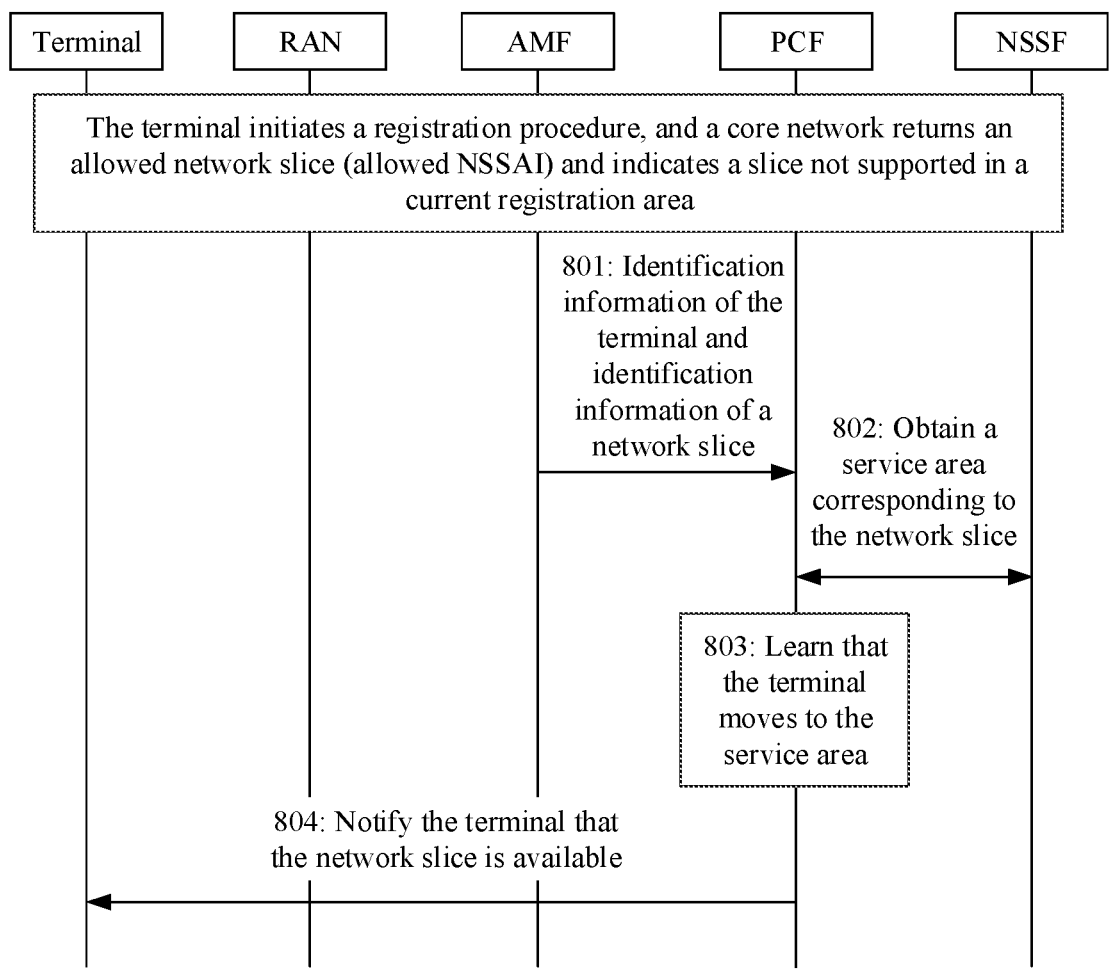
FIG. 8 is a schematic diagram of another slice information update method, in accordance with some embodiments.

FIG. 8 is a schematic diagram of another slice information update method, in accordance with some embodiments. For example, the method may be used to resolve the problems of how a core network side notifies a terminal and which terminals are notified when the slice 4 that is shown in FIG. 3 and that is not supported in the current registration area of the terminal or the slice 4 that is shown in FIG. 4 and that is not supported in the current registration area of the terminal is updated to be available.

The scenario shown in FIG. 3 is used as an example below for description.

As shown in FIG. 8, before step 801, the terminal initiates a registration procedure, and the core network side returns allowed NSSAI and rejected NSSAI. The rejected NSSAI includes identification information (e.g., the S-NSSAI 4) of a slice (e.g., the slice 4 in FIG. 3) and a rejection cause value, and the rejection cause value indicates that the slice is a network slice not supported in a current registration area of the terminal. Optionally, the coexistence rule is further sent to the terminal. The coexistence rule is that the S-NSSAI 1, the S-NSSAI 2, and the S-NSSAI 3 do not coexist with the S-NSSAI 4 (in other words, the slice 1, the slice 2, and the slice 3 do not coexist with the slice 4).

An AMF (namely, an AMF that serves the terminal) with which the terminal currently registers is an AMF in an AMF set (e.g., the AMF set 1 in FIG. 3). Information stored in the terminal includes allowed NSSAI, rejected NSSAI (including the S-NSSAI 4), the rejection cause value, and the coexistence rule. Information stored in the AMF that serves the terminal includes requested NSSAI of the terminal and NSSAI subscribed to by the terminal.

Herein, it should be noted that, for the example shown in FIG. 3 or FIG. 4, actually, the rejected NSSAI returned by the core network side may further include identification information (e.g., the S-NSSAI 3) of the slice 3 and a rejection cause value, and the rejection cause value indicates that the slice is a network slice that is not supported by the PLMN. For ease of description, in the embodiment shown in FIG. 8, description is provided only when the slice 4 indicated by the S-NSSAI 4 in the rejected NSSAI is updated to be available. For a specific implementation method in which the slice 3 indicated by the S-NSSAI 3 in the rejected NSSAI is updated to be supported by the PLMN, refer to related descriptions of the embodiments subsequently shown in FIG. 5 to FIG. 7.

In the network, there are one or more terminals described above. Therefore, if the slice that is not supported in the current registration area of the terminal is subsequently updated to be available, the terminals that requested the network slice but were rejected should be notified.

The slice information update method shown in FIG. 8 includes the following steps.

Step 801: The AMF sends identification information of the terminal and identification information of a network slice to a PCF, and the PCF receives the identification information of the terminal and the identification information of the network slice from the AMF.

During specific implementation, when the AMF that serves the terminal determines, in the registration procedure of the terminal, that the core network rejects a request of the terminal for a network slice that is not supported in a current registration area of a terminal, the AMF sends notification message to a PCF to which the AMF belongs. The notification message includes the identification information of the terminal and the identification information of the network slice. Then, the PCF stores an association relationship between the identification information of the terminal and the identification information of the network slice.

For example, it is assumed that a current registration area of a terminal 1 includes an AMF 1, but does not include an AMF 2. If the AMF 1 is an AMF in the AMF set 1, slices supported by the AMF 1 include the slice 1, the slice 2, and the slice 3 (where it is assumed that the slice 3 has been updated to be supported by the PLMN). If the AMF 2 is an AMF in the AMF set 2, a slice supported by the AMF 2 includes the slice 4.

Because the registration area in which the terminal 1 is currently located does not include the AMF 2, the terminal 1 currently cannot use the slice 4. Alternatively, this is understood as that the slice 4 is a slice that is not supported in the current registration area of the terminal 1.

Therefore, the AMF 1 may determine, in a registration procedure of the terminal 1, that the slice 4 is a slice not supported in the current registration area of the terminal 1. In this case, the AMF 1 sends identification information of the terminal 1 and the S-NSSAI 4 to the PCF. Then, the PCF stores an association relationship between the identification information of the terminal 1 and the S-NSSAI 4.

Step 802: The PCF obtains, from an NSSF, a service area corresponding to the network slice.

In a specific implementation, the PCF may send a request message to the NSSF, to request the service area corresponding to the network slice. The service area may be a cell list including one or more cells.

The foregoing example is still used for description. In this case, the PCF sends a request message to the NSSF. The request message includes the S-NSSAI 4. Then, the NSSF returns, to the PCF, a service area corresponding to the S-NSSAI 4.

Step 803: The PCF learns that the terminal moves to the service area.

In an implementation, a manner in which the PCF learns that the terminal moves to the service area may be:

The PCF subscribes to a notification from the AMF: When a location of the terminal is updated, the AMF sends an updated location of the terminal to the PCF. For example, the PCF may send a subscription request message to the AMF. The subscription request message carries an identifier of the terminal, and the subscription request message is used to subscribe to the location of the terminal from the AMF. Alternatively, the PCF invokes a subscription service by sending an identifier of the terminal to the AMF: When a location of the terminal is updated, the AMF sends an updated location of the terminal to the PCF.

When the terminal moves and initiates a registration update procedure, a registration request message in the registration update procedure may carry current location information of the terminal, and the AMF may obtain the current location information of the terminal. The AMF stores location information carried in a previous registration update procedure of the terminal. Therefore, if a location of the terminal that is indicated by the current location information of the terminal is different from a location of the terminal that is indicated by the previous location information, the AMF reports a latest location of the terminal to the PCF.

Then, the PCF determines, based on the obtained current location of the terminal and the service area corresponding to the network slice, whether the current location of the terminal is in the service area corresponding to the network slice. If the current location of the terminal is in the service area, the PCF learns that the terminal moves to the service area.

The foregoing example is still used for description. If the PCF determines that a current location of the terminal 1 is in the service area corresponding to the S-NSSAI 4, the PCF determines that the terminal 1 moves to the service area corresponding to the S-NSSAI 4.

Step 804: The PCF notifies the terminal that the network slice is available.

In a specific implementation, the PCF may send indication information to the terminal by using an AMF with which the terminal registers. The indication information is used to indicate that the network slice is available. For example, the PCF sends an update message to the AMF with which the terminal registers. The update message carries the identification information of the terminal and the indication information. Optionally, the update message further carries the identification information of the network slice, and the network slice is a network slice updated from being unavailable to the terminal to being currently available to the terminal. The indication information is used to indicate that the network slice is available. Then, the AMF sends a NAS message to the terminal. The NAS message includes the indication information. If the update message sent by the PCF to the AMF with which the terminal registers carries the identification information of the network slice, the AMF also adds the identification information of the network slice to the NAS message, and sends the NAS message to the terminal. A specific implementation in which the PCF sends the update message to the AMF is the same as that in step 703. For details, refer to the foregoing descriptions. A specific implementation in which the AMF sends the NAS message to the terminal is the same as that in step 704. For details, refer to the foregoing descriptions.

The foregoing example is still used for description. After determining that the terminal 1 moves to the service area corresponding to the S-NSSAI 4, the PCF sends an update message to the AMF 1. The update message includes the identification information of the terminal 1 and the indication information. The indication information is used to indicate that the slice 4 identified by the S-NSSAI 4 is currently available. Then, the AMF 1 sends a NAS message to the terminal 1. The NAS message includes the S-NSSAI 4. Optionally, the NAS message further includes the indication information. After obtaining the NAS message, the terminal 1 may determine that the terminal can use the slice 4 at the current location. Therefore, the terminal 1 may subsequently use the slice 4 to initiate a service procedure. For example, the terminal 1 first re-registers with the AMF 2, and then initiates the service procedure by using the slice 4.

According to the foregoing method, when the terminal moves to the service area corresponding to the network slice, the PCF may notify the terminal that the network slice is currently available. The network slice is a network slice that was requested by the terminal but was rejected and that was not supported in a registration area in which the terminal is located before the movement. In this way, when the network slice that was once not supported in the registration area of the terminal is updated to be available, the corresponding terminal may be notified in a timely manner. Therefore, the terminal can use the network slice when having a service requirement corresponding to the network slice. This helps improve a service capability of the terminal.

It should be noted that the embodiments shown in FIG. 5 to FIG. 8 may be implemented as separate embodiments, or may be implemented in combination. For example, the embodiments shown in FIG. 5 to FIG. 7 may be separately implemented in combination with Embodiment 8. For another example, the embodiments shown in FIG. 5 and FIG. 6 may be separately implemented in combination with the embodiment shown in FIG. 7. For another example, the embodiments shown in FIG. 5, FIG. 7, and FIG. 8 may be implemented in combination. For another example, the embodiments shown in FIG. 6, FIG. 7, and FIG. 8 may be implemented in combination. A specific combination manner of the embodiments is not limited in this application, and the embodiments may be combined based on an actual requirement.

It should be noted that the notification message, the update message, the NAS message, the subscription request message, the configuration update message, and the like in the foregoing embodiments are merely names, and the names do not constitute a limitation on the messages. In a 5G network and another future network, the notification message, the update message, the NAS message, the subscription request message, and the configuration update message may alternatively be other names. This is not specifically limited in the embodiments of this application.

Therefore, the present disclosure provides a slice information update method, including:

receiving, by a communications network element, a notification message from a network slice selection network element, where the notification message includes identification information of a network slice, and the notification message is used to indicate that a public land mobile network PLMN supports the network slice; and notifying, by the communications network element, a terminal that the PLMN supports the network slice, where the terminal is a terminal that failed to request the network slice and has subscribed to the network slice.

The communications network element may be a mobility management network element or a policy control network element.

In an implementation, the method further includes: determining, by the communications network element, the terminal based on a context of the terminal.

In a possible implementation, if the communications network element is a management network element, the method further includes: adding, by the mobility management network element, the identification information of the network slice to a set of allowed network slices of the terminal; and the notifying, by the communications network element, a terminal that the PLMN supports the network slice includes: sending, by the mobility management network element, an updated set of allowed network slices to the terminal. Optionally, the notifying, by the communications network element, a terminal that the PLMN supports the network slice further includes: sending, by the mobility management network element, indication information to the terminal, where the indication information is used to indicate that the PLMN supports the network slice.

In another possible implementation, if the communications network element is a policy control network element, the method further includes: determining, by the policy control network element, a mobility management network element with which the terminal registers; and the notifying, by the communications network element, a terminal that the PLMN supports the network slice includes: sending, by the policy control network element, the indication information to the terminal by using the mobility management network element, where the indication information is used to indicate that the PLMN supports the network slice.

In the slice information update method, for example, if the communications network element is a mobility management network element, for operations of the mobility management network element, refer to the operations of the AMF in FIG. 5 and the foregoing related text descriptions. Details are not described herein again. For example, if the communications network element is a policy control network element, for operations of the policy control network element, refer to the operations of the PCF in FIG. 6 and the foregoing related text descriptions. Details are not described herein again.

The present disclosure further provides a slice information update method, including:

receiving, by a mobility management network element, an update message from a policy control network element, where the update message includes indication information and identification information of a terminal, and the indication information is used to indicate that a public land mobile network PLMN supports a network slice; and notifying, by the mobility management network element, the terminal that the PLMN supports the network slice, where the terminal is a terminal that failed to request the network slice and has subscribed to the network slice.

In a possible implementation, the method further includes: adding, by the mobility management network element, identification information of the network slice to a set of allowed network slices of the terminal; and the notifying, by the mobility management network element, a terminal that the PLMN supports the network slice includes: sending, by the mobility management network element, an updated set of allowed network slices to the terminal.

In a possible implementation, the notifying, by the mobility management network element, a terminal that the PLMN supports the network slice further includes: sending, by the mobility management network element, the indication information to the terminal, where the indication information is used to indicate that the PLMN supports the network slice.

In a possible implementation, the notifying, by the mobility management network element, a terminal that the PLMN supports the network slice includes: sending, by the mobility management network element, a NAS message to the terminal, where the NAS message includes the indication information.

In the slice information update method, for example, for operations of the mobility management network element, refer to the operations of the AMF in FIG. 7 and the foregoing related text descriptions. Details are not described herein again.

The present disclosure further provides a slice information update method, including:

receiving, by a policy control network element, identification information of a terminal and identification information of a network slice that are from a mobility management network element, where the network slice is a network slice that is not supported in a current registration area of the terminal;

obtaining, by the policy control network element from a network slice selection network element, a service area corresponding to the network slice; and if learning that the terminal moves to the service area, notifying, by the policy control network element, the terminal that the network slice is available.

In a possible implementation, the notifying, by the policy control network element, the terminal that the network slice is currently available includes: sending, by the policy control network element, indication information to the terminal by using the mobility management network element, where the indication information is used to indicate that the network slice is available.

In the slice information update method, for example, for operations of the policy control network element, refer to the operations of the PCF in FIG. 8 and the foregoing related text descriptions. Details are not described herein again.

The present disclosure further provides a slice information update method, including:

determining, by a network slice selection network element, that a public land mobile network PLMN supports a network slice; and sending, by the network slice selection network element, a notification message to a communications network element, where the notification message includes identification information of the network slice, and the notification message is used to indicate that the PLMN supports the network slice. Optionally, the communications network element is a policy control network element or a mobility management network element.

In a possible implementation, the method further includes: receiving, by the network slice selection network element from the communications network element, a subscription that when the PLMN supports the network slice, the network slice selection network element notifies the communications network element.

In a possible implementation, the method further includes: determining, by the network slice selection network element based on a slice type supported by a mobility management network element in the PLMN, that the mobility management network element supporting the network slice is the communications network element.

In the slice information update method, for example, for operations of the network slice selection network element, refer to the operations of the NSSFs in FIG. 5 to FIG. 7 and the foregoing related text descriptions. Details are not described herein again.

Figure 9:
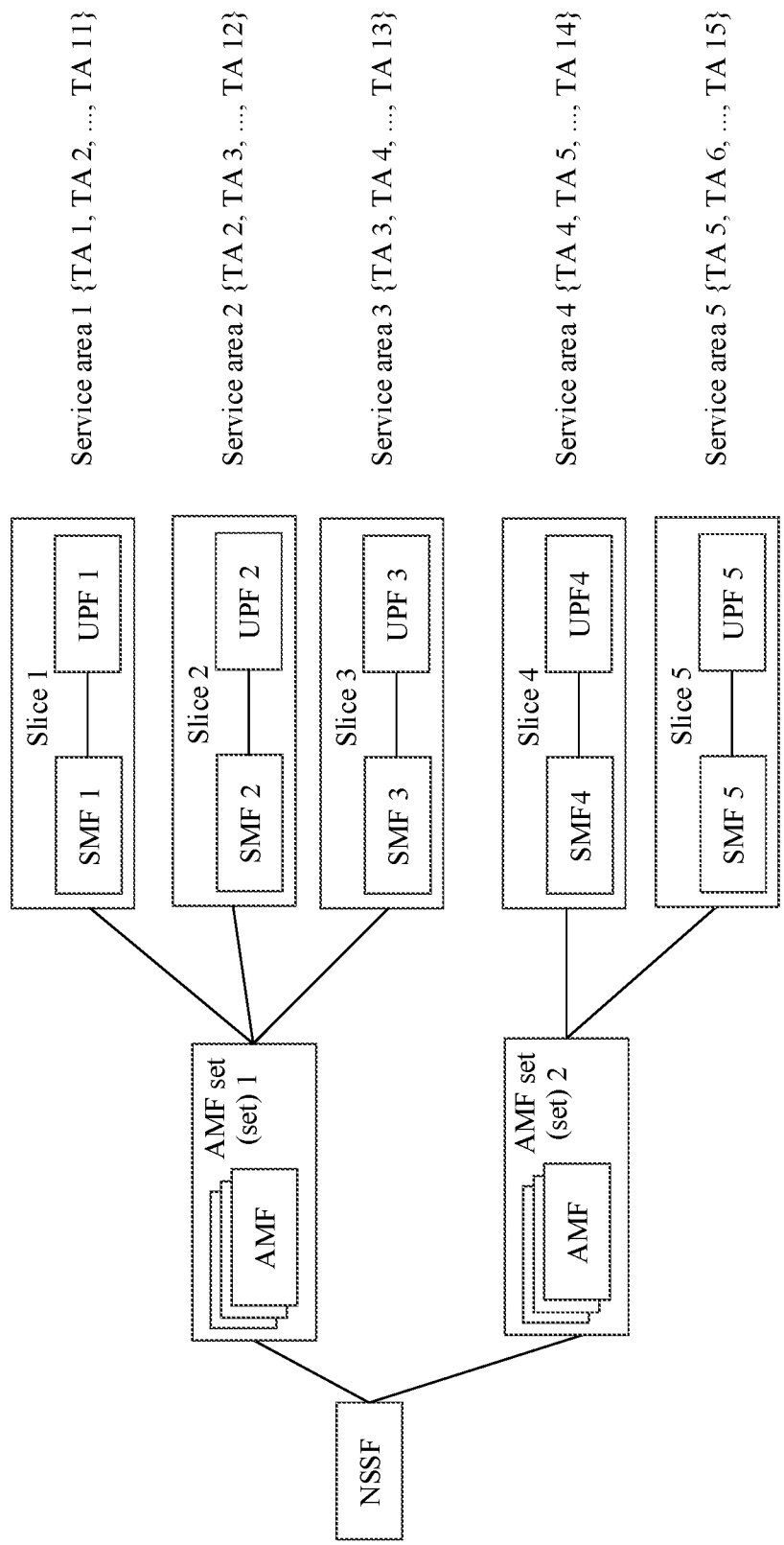
FIG. 9 is a schematic diagram of a third application scenario, in accordance with some embodiments.

FIG. 9 is a schematic diagram of a third application scenario, in accordance with some embodiments. A network side includes two AMF sets: an AMF set 1 and an AMF set 2. Network slices supported by any AMF in the AMF set 1 are {slice 1, slice 2, slice 3}, a service area of the slice 1 is a service area 1, a service area of the slice 2 is a service area 2, and a service area of the slice 3 is a service area 3. Network slices supported by any AMF in the AMF set 2 are {slice 4, slice 5}, a service area of the slice 4 is a service area 4, and a service area of the slice 4 is a service area 5.

The slice 1, the slice 2, the slice 3, the slice 4, and the slice 5 in the foregoing example may be respectively identified by S-NSSAI 1, S-NSSAI 2, S-NSSAI 3, S-NSSAI 4, and S-NSSAI 5. In other words, the S-NSSAI 1 is identification information of the slice 1, the S-NSSAI 2 is identification information of the slice 2, the S-NSSAI 3 is identification information of the slice 3, the S-NSSAI 4 is identification information of the slice 4, and the S-NSSAI 5 is identification information of the slice 5.

Each network slice corresponds to one or more SMFs and one or more UPFs. For example, as shown in FIG. 9, the slice 1 corresponds to an SMF 1 and a UPF 1, the slice 2 corresponds to an SMF 2 and a UPF 2, the slice 3 corresponds to an SMF 3 and a UPF 3, the slice 4 corresponds to an SMF 4 and a UPF 4, and the slice 5 corresponds to an SMF 5 and a UPF 5.

In addition, the slices supported by any AMF in the AMF set 1 and the slices supported by any AMF in the AMF set 2 are in an isolation relationship (or referred to as a mutually exclusive relationship or a non-coexistence relationship). The isolation relationship may be understood as that two different slices cannot be connected or accessed at the same time. Therefore, the terminal can access only a slice in the slice 1, the slice 2, and the slice 3, or can access only a slice in the slice 4 and the slice 5, but cannot access a slice in the slice 1, the slice 2, and the slice 3, and a slice in the slice 4 and the slice 5 at the same time.

A service area of a slice is a scope in which the slice can provide a service. To be specific, the slice may provide a service for a terminal located in the service area of the slice. Alternatively, this is understood as that a terminal located in the service area of the slice can use a service provided by the slice, and a terminal located outside the service area of the slice cannot use a service provided by the slice. In an implementation, the service area may include one or more tracking areas (TA), and one TA may be uniquely identified by using a tracking area identity (TAI). Therefore, this may also be understood as that one slice corresponds to one service area, or may be understood as that one slice corresponds to one or more TAs.

For example, in the embodiment shown in FIG. 9, the service areas of the slice 1 to the slice 5 each include 10 TAs. Details are as follows:

The service area of the slice 1 includes a TA 1, a TA 2, . . . , and a TA 11.

The service area of the slice 2 includes the TA 2, the TA 3, . . . , and a TA 12.

The service area of the slice 3 includes the TA 3, the TA 4, . . . , and a TA 13.

The service area of the slice 4 includes the TA 4, the TA 5, . . . , and a TA 14.

The service area of the slice 5 includes the TA 5, the TA 6, . . . , and a TA 15.

In this example, service areas of any two slices include overlapping TAs. For example, overlapping TAs included in the service area of the slice 1 and the service area of the slice 2 are the TA 2, the TA 3, . . . , and the TA 11.

Further, a service status of any slice in any TA in the service area of the slice may be an "available state" or a "restricted state". If a slice can serve a terminal in a TA, a service status of the slice in the TA is an "available state". If a slice cannot serve a terminal in a TA service status of the slice in the TA is a "restricted state". The "restricted state" may also be referred to as a "temporarily unavailable state".

It should be noted that a slice in a TA may be switched between the two service states, for example, switched from the "available state" to the "restricted state", or switched from the "restricted state" to the "available state".

It should be noted that, if a service status of a slice in a TA is the "available state", the TA may also be referred to as a TA in which the slice is in the "available state", or referred to as a TA in which the slice is available. If a service status of a slice in a TA is the "restricted state", the TA may also be referred to as a TA in which the slice is in the "restricted state", or referred to as a TA in which the slice is unavailable.

In a possible implementation, an NSSF may determine a current service status of a slice in one or more TAs based on load of the slice. For example, for a slice, if a relatively large quantity of users access the slice, and load of the slice exceeds a preset threshold, the NSSF may switch the service status of the slice in one or more TAs from the "available state" to the "restricted state". For another example, for a slice, if a relatively small quantity of users access the slice, and load of the slice is less than a preset threshold, the NSSF may switch the service status of the slice in one or more TAs from the "restricted state" to the "available state".

For the application scenario shown in FIG. 9, when a service status of a slice in a TA or some TAs is the "restricted state", a terminal in the TA requests to access the slice but is rejected. Subsequently, the service status of the slice in the TA is switched from the "restricted state" to the "available state". In this case, how the network side notifies the terminal is a problem to be resolved in this application.

It should be noted that, that a terminal registering with the network may use a slice means that the slice in any TA included in a registration area of the terminal is in the "available state". In other words, a TA set included in the registration area of the terminal is a subset of a set including TAs in which the slice is in the "available state". For example, the registration area of the terminal is RA={TA 4, TA 5, TA 6}. For the slice 3, if the slice 3 is always in the "available state" in the TA 3 to the TA 13, because the set including the TA 4 to the TA 6 is a subset of the set including the TA 3 to the TA 13, the terminal can use the slice 3. For another example, the registration area of the terminal is RA={TA 4, TA 5, TA 6}. For the slice 3, if the slice 3 is available in each of the TA 5 to the TA 13 but is unavailable in TA 3 and TA 4, because the set including the TA 4 to the TA 6 is not a subset of the set including the TA 5 to the TA 13, the terminal cannot use the slice 3.

Figure 10:
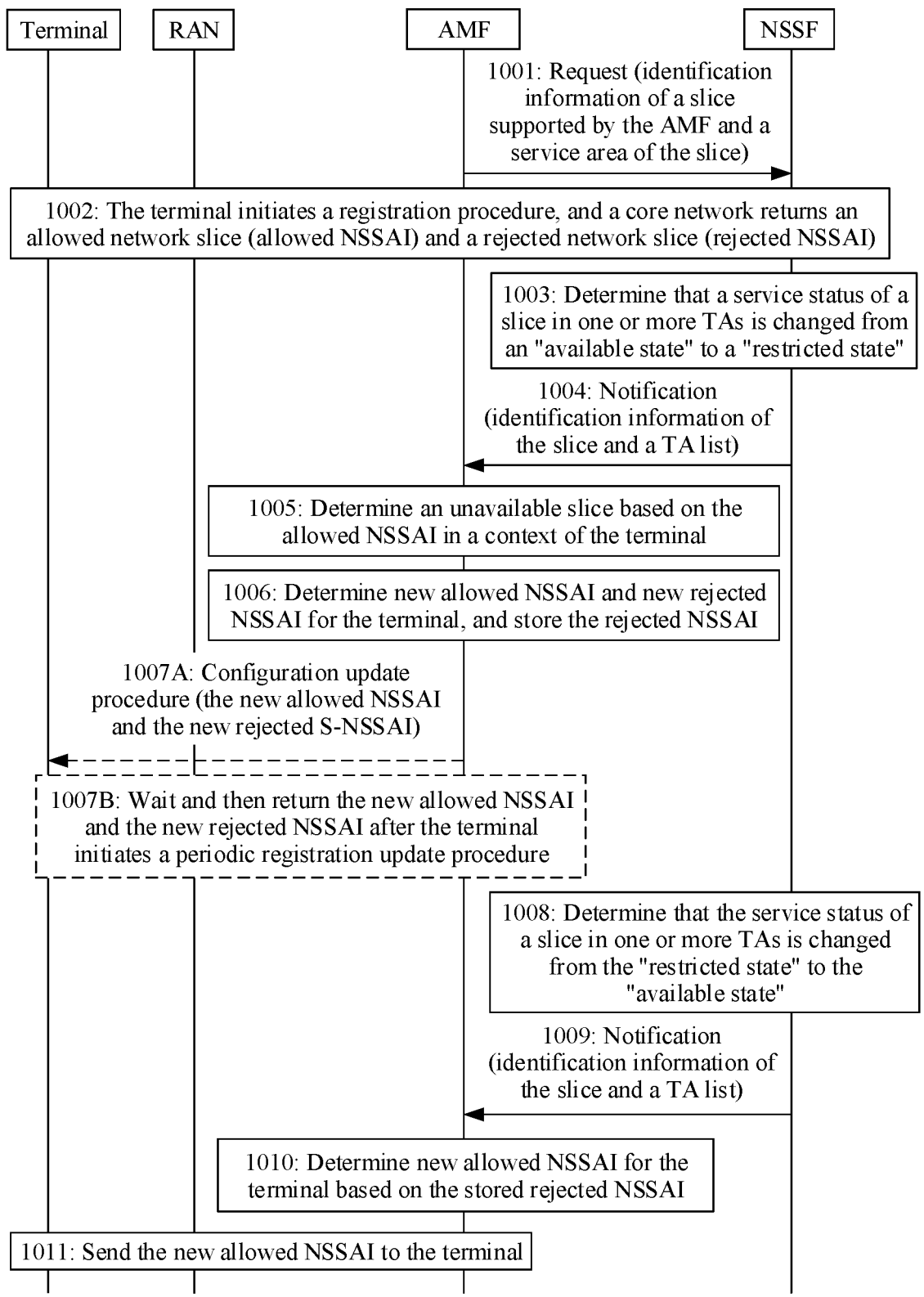
FIG. 10 is a schematic diagram of another slice information update method, in accordance with some embodiments.
Figure 11:
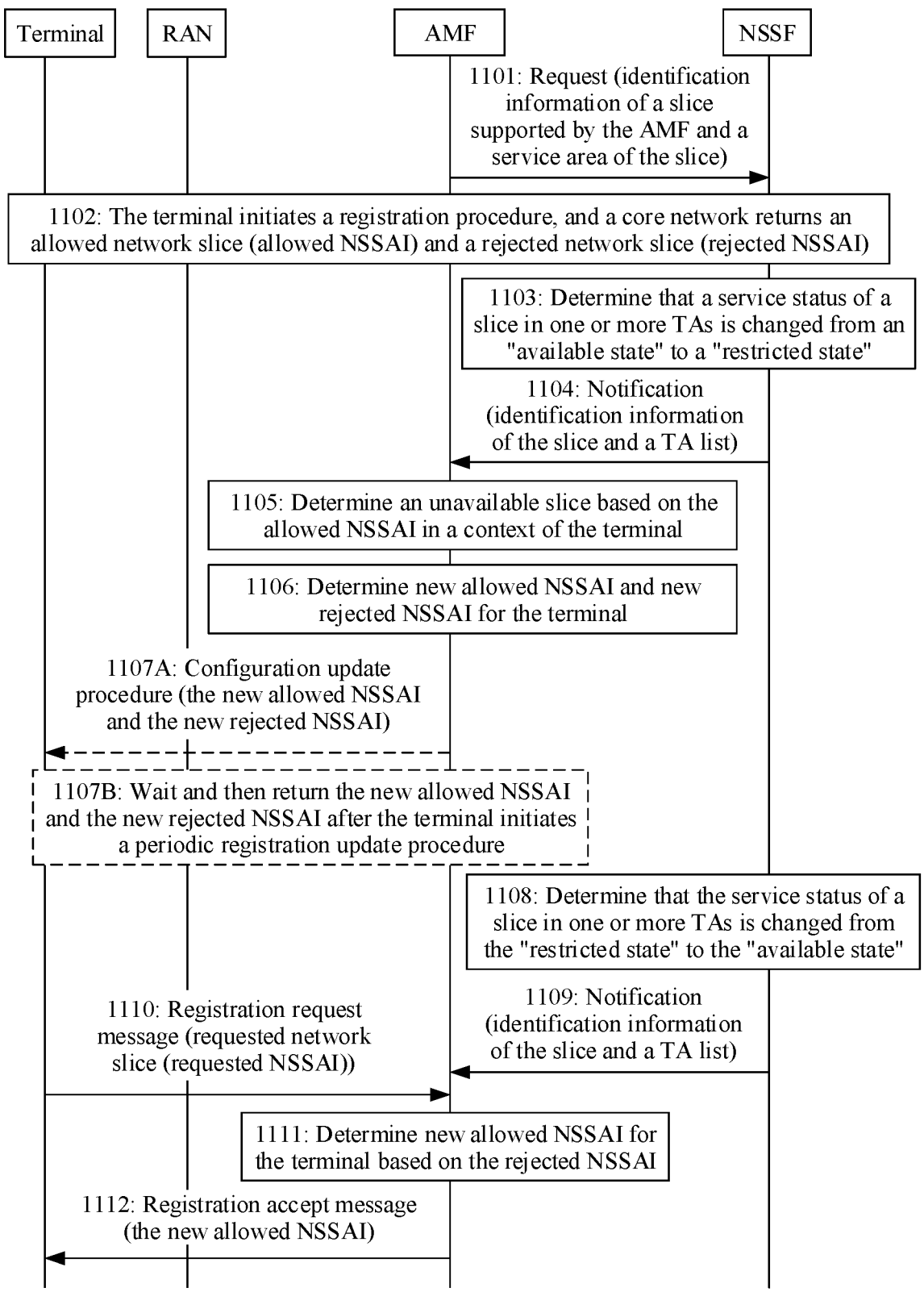
FIG. 11 is a schematic diagram of another slice information update method, in accordance with some embodiments.

As examples, the following provides two different implementation methods, which are respectively shown in FIG. 10 and FIG. 11. Descriptions are separately provided below.

It should be noted that, in the embodiments shown in FIG. 10 and FIG. 11, a terminal is always located in a registration area of the terminal. In other words, the terminal never moves out of the registration area of the terminal. For a specific implementation process of a method for updating slice information after the terminal moves out of the registration area, refer to related descriptions in the prior art.

FIG. 10 is a schematic diagram of another slice information update method, in accordance with some embodiments. The method includes the following steps.

Step 1001: An AMF sends a request to an NSSF. Correspondingly, the NSSF may receive the request.

For example, the request may be an Nnssf_NSSAIAvailability_Update request, or may be a request message.

The request is used to report, to the NSSF, identification information of a slice supported by the AMF and a service area corresponding to each slice (where one service area may include one or more TAs).

For example, for each AMF in the AMF set 1 shown in FIG. 9, information separately reported to the NSSF includes:

S-NSSAI 1, and TAI 1 to TAI 11;
S-NSSAI 2, and TAI 2 to TAI 12; and
S-NSSAI 3, and TAI 3 to TAI 13.

For each AMF in the AMF set 2 shown in FIG. 9, information separately reported to the NSSF includes:

S-NSSAI 4, and TAI 4 to TAI 14; and
S-NSSAI 5, and TAI 5 to TAI 15.

Step 1002: A terminal initiates a registration procedure, and a core network returns allowed NSSAI and rejected NSSAI.

It is assumed that NSSAI subscribed to by the terminal is {S-NSSAI 1, S-NSSAI 2, S-NSSAI 3, S-NSSAI 4, S-NSSAI 5}, and the terminal is currently located in the TA 5.

Case 1: The terminal does not know that the slices supported by the AMF set 1 are isolated from the slices supported by the AMF set 2.

The terminal initiates a registration request. Requested NSSAI carried in the registration request may include {S-NSSAI 1, S-NSSAI 2, S-NSSAI 3, S-NSSAI 4, S-NSSAI 5}. When selecting an AMF based on the requested NSSAI, the RAN finds that the S-NSSAI-1, the S-NSSAI-2, and the S-NSSAI-3 are served by the AMF set 1, but the S-NSSAI-4 and the S-NSSAI-5 are served by the AMF set 2. For example, the RAN preferentially selects an AMF in the AMF set 1 as a serving AMF.

Further, the network side determines the allowed NSSAI and a registration area RA of the terminal based on the requested NSSAI of the terminal. For example, information sent by the serving AMF to the terminal is as follows:

allowed NSSAI: {S-NSSAI 1, S-NSSAI 2, S-NSSAI 3};
rejected NSSAI: {S-NSSAI 4 with a cause value 2, S-NSSAI 5 with a cause value 2}; and
RA={TA 4, TA 5, TA 6}. It is assumed that the registration area of the terminal includes three TAs. The allowed NSSAI includes identification information of the allowed network slices of the core network side. To be specific, the core network side allows the terminal to access the slice 1 and the slice 2.

The rejected NSSAI includes identification information of rejected network slices of the core network side. To be specific, the core network side rejects access of the terminal to the slice 4 and the slice 5. The cause value for rejecting the access of the terminal to the slice 4 and the slice 5 is 2. The cause value 2 corresponding to the slice 4 indicates that the slice 4 is isolated from the slices in the allowed NSSAI, and the cause value 2 corresponding to the slice 5 indicates that the slice 5 is isolated from the slices in the allowed NSSAI.

Further, the serving AMF may further store the following information in a context of the terminal:

RA={TA 4, TA 5, TA 6}; and
allowed NSSAI: {S-NSSAI 1, S-NSSAI 2, S-NSSAI 3}.

In addition, the AMF further stores a service status of each network slice that is in the allowed NSSAI and in each TA in the service area of the network slice. The slice 1 identified by the S-NSSAI 1 in the allowed NSSAI is used as an example. The AMF records a service status of the slice 1 in each of the TA 1 to the TA 13. For example, recorded information is that the slice 1 is in an "available state" in the TA 1 to the TA 7, and are in a "restricted state" (namely, a temporarily unavailable state) in the TA 8 to the TA 13. A service status of the slice 2 in each TA and a service status of the slice 3 in each TA are recorded by using a similar method. No example is provided for description.

Further, the serving AMF may send an isolation rule (or referred to as a coexistence rule) to the terminal: The S-NSSAI 1, the S-NSSAI 2, and the S-NSSAI 3 are isolated from the S-NSSAI 4 and the S-NSSAI 5.

Case 2: The terminal learns that the slices supported by the AMF set 1 are isolated from the slices supported by the AMF set 2, and a service status of the slice 3 in the AMF set 1 is a "restricted state".

For example, an isolation rule is preconfigured on the terminal, and the isolation rule indicates that the NSSAI 1, the S-NSSAI 2, and the S-NSSAI 3 are isolated from the S-NSSAI 4 and the S-NSSAI 5. Therefore, while requesting the NSSAI 1, the S-NSSAI 2, and the S-NSSAI 3, the terminal does not request the S-NSSAI 4 and the S-NSSAI 5 at the same time.

The terminal initiates a registration request. For example, requested NSSAI carried in the request includes {S-NSSAI 1, S-NSSAI 2, S-NSSAI 3}. When selecting an AMF based on the requested NSSAI, a RAN finds that the S-NSSAI-1, the S-NSSAI-2, and the S-NSSAI-3 are all served by the AMF set 1. Therefore, the RAN may select an AMF from the AMF set 1 as a serving AMF (serving AMF).

Further, the network side determines the allowed NSSAI and a registration area (register area, RA) of the terminal based on the requested NSSAI of the terminal. For example, information sent by the serving AMF to the terminal is as follows:

allowed NSSAI: {S-NSSAI 1, S-NSSAI 2, S-NSSAI 3}; and

RA={TA 4, TA 5, TA 6}. It is assumed that the registration area of the terminal includes three TAs.

The allowed NSSAI includes identification information of the allowed network slices of the core network side. To be specific, the core network side allows the terminal to access the slice 1 and the slice 2.

Further, the serving AMF may further store the following information in a context of the terminal:

RA={TA 4, TA 5, TA 6}; and
allowed NSSAI: {S-NSSAI 1, S-NSSAI 2, S-NSSAI 3}.

The foregoing examples are specific implementations provided only for ease of description. Certainly, during actual application, the present disclosure is not limited to the foregoing implementation, and may alternatively be implemented in another manner.

Step 1003: The NSSF determines that a service status of one or more slices in one or more TAs is changed from an "available state" to a "restricted state".

The foregoing example of step 1002 is used as an example. The terminal is currently located in the TA 5, and the registration area RA of the terminal is {TA 4, TA 5, TA 6}. The slice 3 is used as an example.

In a first example, before step 1003, the slice 3 is available in all the TAs. In other words, the slice 3 is available in each of the TA 3 to the TA 13. In step 1003, if the NSSF determines that load of the slice 3 is greater than a preset threshold, the NSSF determines that the service status of the slice 3 in all the TAs is changed from the "available state" to the "restricted state". Therefore, after the change, the slice 3 is unavailable in all the TAs. In other words, the slice 3 is unavailable in each of the TA 3 to the TA 13.

In a second example, before step 1003, the slice 3 is available in all the TAs. In other words, the slice 3 is available in each of the TA 3 to the TA 13. In step 1003, if the NSSF determines that load of the slice 3 is greater than a preset threshold, the NSSF determines that the service status of the slice 3 in some TAs is changed from the "available state" to the "restricted state". For example, the NSSF determines that the service status of the slice 3 in the TA 5 and the TA 6 is changed from the "available state" to the "restricted state". Therefore, after the change, the slice 3 is unavailable in the TA 5 and the TA 6, and is available in the TA 3, the TA 4, and the TA 7 to the TA 13.

In a third example, before step 1003, the slice 3 is available in some TAs, for example, is available in the TA 3 to the TA 10, and is unavailable in the TA 11 to the TA 13. In step 1003, if the NSSF determines that load of the slice 3 is greater than a preset threshold, the NSSF determines that the service status of the slice 3 in all the available TAs (namely, the TA 3 to the TA 10) is changed from the "available state" to the "restricted state". Therefore, after the change, the slice 3 is unavailable in all the TAs. In other words, the slice 3 is unavailable in each of the TA 3 to the TA 13.

In a fourth example, before step 1003, the slice 3 is available in some TAs, for example, is available in the TA 3 to the TA 10, and is unavailable in the TA 11 to the TA 13. In step 1003, if the NSSF determines that load of the slice 3 is greater than a preset threshold, the NSSF determines that the service status of the slice 3 in some available TAs is changed from the "available state" to the "restricted state". For example, the NSSF determines that the service status of the slice 3 in the TA 6 to the TA 10 is changed from the "available state" to the "restricted state". Therefore, after the change, the slice 3 is unavailable in the TA 6 to the TA 13, and is available in the TA 3 to the TA 5.

In a fifth example, before step 1003, the slice 3 is available in some TAs, for example, is available in the TA 3 to the TA 10, and is unavailable in the TA 11 to the TA 13. In step 1003, if the NSSF determines that load of the slice 3 is greater than a preset threshold, the NSSF determines that the service status of the slice 3 in some available TAs is changed from the "available state" to the "restricted state". For example, the NSSF determines that the service status of the slice 3 in the TA 7 to the TA 10 is changed from the "available state" to the "restricted state". Therefore, after the change, the slice 3 is unavailable in the TA 7 to the TA 13, and is available in the TA 3 to the TA 6.

Step 1004: The NSSF sends a notification to the AMF. Correspondingly, the AMF may receive the notification.

For example, the notification may be Nnssf_NSSAIAvailability_Notify, or may be a notification message.

The notification includes identification information of a slice and identification information of at least one TA. The identification information of the at least one TA herein may be represented by using a TA list during specific implementation. In other words, the notification may include the identification information of the slice and the TA list, and the TA list includes the identification information of the at least one TA.

For ease of description, this application is subsequently described by using an example in which the notification includes the identification information of the slice and the TA list.

The slice herein is the one or more slices whose service status in some or all TAs is changed from the "available state" to the "restricted state" and that is determined in step 1003, for example, the slice 3 in each example in step 1003. The TA list herein includes one or more TAs, and a status of the slice in any TA in the TA list is changed from the "available state" to the "restricted state".

For example, for the first example in step 1003, the slice herein is the slice 3, and the TA list includes the TA 3 to the TA 13. For another example, for the second example in step 1003, the slice herein is the slice 3, and the TA list includes the TA 5 and the TA 6. For another example, for the third example in step 1003, the slice herein is the slice 3, and the TA list includes the TA 3 to the TA 10. For another example, for the fourth example in step 1003, the slice herein is the slice 3, and the TA list includes the TA 6 to the TA 10. For another example, for the fifth example in step 1003, the slice herein is the slice 3, and the TA list includes the TA 7 to the TA 10.

It should be noted that, if in step 1002, the AMF does not store the service status of each network slice that is in the allowed NSSAI and in each TA in the service area of the network slice, in step 1004, the notification may carry the service status of the slice in each TA in the service area of the slice. In other words, for any one of the four examples in step 1003, the notification message in step 1004 may carry all the identification information of the slice and a current service status of the slice in each TA of the slice.

Step 1005: The AMF determines an unavailable slice of the terminal based on the allowed NSSAI in a context of the terminal.

For example, in the case 1 or case 2 in step 1002, information stored by the AMF in a context of a terminal includes:

RA={TA 4, TA 5, TA 6}; and allowed NSSAI: {S-NSSAI 1, S-NSSAI 2, S-NSSAI 3}.

For the first example in step 1003, the notification in step 1004 carries the identifier S-NSSAI 3 of the slice 3 and identifiers of the TA 3 to the TA 13. The service status of the slice 3 in the TA 3 to the TA 13 is changed to the "restricted state", and the RA of the terminal includes the TA 4, the TA 5, and the TA 6. Therefore, the terminal cannot use the slice 3 in the TA 4 to the TA 6, and the terminal cannot use the slice 3. That is, the determined slice 3 in the allowed NSSAI of the terminal is currently unavailable. Therefore, the determined unavailable slice of the terminal includes the slice 3.

For the second example in step 1003, the notification in step 1004 carries the identifier S-NSSAI 3 of the slice 3 and identifiers of the TA 5 and the TA 6. The service status of the slice 3 in the TA 5 and the TA 6 is changed to the "restricted state", and the RA of the terminal includes the TA 4, the TA 5, and the TA 6. Therefore, the terminal cannot use the slice 3 in the TA 5 and the TA 6, and the terminal cannot use the slice 3. That is, the determined slice 3 in the allowed NSSAI of the terminal is currently unavailable. Therefore, the determined unavailable slice of the terminal includes the slice 3.

For the third example in step 1003, the notification in step 1004 carries the identifier S-NSSAI 3 of the slice 3 and identifiers of the TA 3 to the TA 10. The service status of the slice 3 in the TA 3 to the TA 10 is changed to the "restricted state", and the RA of the terminal includes the TA 4, the TA 5, and the TA 6. Therefore, the terminal cannot use the slice 3 in the TA 4 to the TA 6, and the terminal cannot use the slice 3. That is, the determined slice 3 in the allowed NSSAI of the terminal is currently unavailable. Therefore, the determined unavailable slice of the terminal includes the slice 3.

For the fourth example in step 1003, the notification in step 1004 carries the identifier S-NSSAI 3 of the slice 3 and identifiers of the TA 6 to the TA 10. The service status of the slice 3 in the TA 6 to the TA 10 is changed to the "restricted state", and the RA of the terminal includes the TA 4, the TA 5, and the TA 6. Therefore, the terminal cannot use the slice 3 in the TA 6, and the terminal cannot use the slice 3. That is, the determined slice 3 in the allowed NSSAI of the terminal is currently unavailable. Therefore, the determined unavailable slice of the terminal includes the slice 3.

For the fifth example in step 1003, the notification in step 1004 carries the identifier S-NSSAI 3 of the slice 3 and identifiers of the TA 7 to the TA 10. The service status of the slice 3 in the TA 7 to the TA 10 is changed to the "restricted state", the service status of the slice 3 in the TA 3 to the TA 6 is the "available state", and the RA of the terminal includes the TA 4, the TA 5, and the TA 6. Therefore, the terminal can still use the slice 3. Therefore, it is determined that the slice 3 in the allowed NSSAI is still available currently. Based on Example 5, if the slice 1 and the slice 2 in the allowed NSSAI are still available, the AMF determines that the slices in the allowed NSSAI are all available or accessible to the terminal.

That is, provided that the terminal can use a slice in all TAs (namely, any TA) in the registration area of the terminal, it may be referred to as that the terminal can use the slice or that the terminal can access the slice. In other words, provided that the terminal cannot use a slice in any TA in the registration area, it may be referred to as that the terminal cannot use the slice.

Step 1006: The AMF determines new allowed NSSAI and new rejected NSSAI for the terminal, and stores the rejected NSSAI.

Based on the foregoing example, if the AMF determines that the terminal cannot use the slice 3 currently, and further determines that the terminal can still use the slice 1 and the slice 2 currently, the new allowed NSSAI determined by the AMF for the terminal in step 1006 is {S-NSSAI 1, S-NSSAI 2}, and the rejected NSSAI determined for the terminal includes {S-NSSAI 3}. In addition, the AMF further stores the rejected NSSAI.

Step 1007A: If the terminal is in a connected state, the AMF sends the new allowed NSSAI and the new rejected NSSAI to the terminal by using a configuration update procedure.

Step 1007B: If the terminal is in an idle state, the AMF may wait and then send the new allowed NSSAI and the new rejected NSSAI to the terminal after the terminal is in a connected state again (e.g., after the terminal initiates a periodic registration update procedure).

Either step 1007A or step 1007B is performed.

Step 1008: The NSSF determines that the service status of one or more slices in one or more TAs is changed from the "restricted state" to the "available state".

Step 1008 is a reverse step of step 1003. The examples in step 1003 are still used as examples.

In the first example, after step 1003, the slice 3 is unavailable in all the TAs. In other words, the slice 3 is unavailable in each of the TA 3 to the TA 13. In step 1008, if the NSSF determines that the load of the slice 3 is less than the preset threshold, the NSSF determines that the service status of the slice 3 in all the TAs is changed from the "restricted state" to the "available state". Therefore, after the change, the slice 3 is available in all the TAs. In other words, the slice 3 is available in each of the TA 3 to the TA 13.

In the second example, after step 1003, the slice 3 is unavailable in the TA 5 and the TA 6, and is available in the TA 3, the TA 4, and the TA 7 to the TA 13. In step 1008, if the NSSF determines that the load of the slice 3 is less than the preset threshold, the NSSF determines that the service status of the slice 3 in some unavailable TAs is changed from the "restricted state" to the "available state", for example, determines that the service status of the slice 3 in the TA 3 to the TA 6 is changed from the "restricted state" to the "available state". Therefore, after the change, the slice 3 is available in each of the TA 3, TA 4, and the TA 6 to the TA 13, and is unavailable in the TA 5.

In the third example, after step 1003, the slice 3 is unavailable in each of the TA 3 to the TA 13. In step 1008, if the NSSF determines that the load of the slice 3 is less than the preset threshold, the NSSF determines that the service status of the slice 3 in some unavailable TAs is changed from the "restricted state" to the "available state", for example, determines that the service status of the slice 3 in the TA 3 to the TA 8 is changed from the "restricted state" to the "available state". Therefore, after the change, the slice 3 is available in each of the TA 3 to the TA 8, and is still unavailable in the TA 9 to the TA 13.

In the fourth example, after step 1003, the slice 3 is available in each of the TA 3 to the TA 5, and is unavailable in each of the TA 6 to the TA 13. In step 1008, if the NSSF determines that the load of the slice 3 is less than the preset threshold, the NSSF determines that the service status of the slice 3 in all the unavailable TAs is changed from the "restricted state" to the "available state". To be specific, the service status of the slice 3 in the TA 6 to the TA 13 is changed from the "restricted state" to the "available state". Therefore, after the change, the slice 3 is available in all the TAs, that is, available in each of the TA 3 to the TA 13.

Step 1009: The NSSF sends a notification to the AMF. Correspondingly, the AMF may receive the notification.

For example, the notification may be Nnssf_NSSAIAvailability_Notify, or may be a notification message.

The notification includes identification information of a slice and identification information of at least one TA. The identification information of the at least one TA herein may be represented by using a TA list during specific implementation. In other words, the notification may include the identification information of the slice and the TA list, and the TA list includes the identification information of the at least one TA.

For ease of description, this application is subsequently described by using an example in which the notification includes the identification information of the slice and the TA list.

The slice herein is the one or more slices whose service status in some or all TAs is changed from the "restricted state" to the "available state" and that is determined in step 1008, for example, the slice 3 in each example in step 1008. The TA list herein includes one or more TAs, and a status of the slice in any TA in the TA list is changed from the "restricted state" to the "available state".

For example, for the first example in step 1008, the slice in the notification in step 1009 is the slice 3, and the TA list includes the TA 3 to the TA 13. For another example, for the second example in step 1008, the slice in the notification in step 1009 is the slice 3, and the TA list includes the TA 6. For another example, for the third example in step 1008, the slice in the notification in step 1009 is the slice 3, and the TA list includes the TA 3 to the TA 8. For another example, for the fourth example in step 1008, the slice in the notification in step 1009 is the slice 3, and the TA list includes the TA 6 to the TA 13.

Step 1010: The AMF determines new allowed NSSAI for the terminal based on the rejected NSSAI stored in a context of the terminal.

For example, in the example in step 1006, the rejected NSSAI stored by the AMF for the terminal includes {S-NSSAI 3}, and the notification in step 1009 carries the slice 3 and the TA list corresponding to the slice 3. In this case, in step 1010, the AMF needs to determine whether the terminal can currently use the slice 3. The following provides descriptions with reference to the foregoing four examples in 1008.

For example, for the first example in step 1008, the AMF determines, based on the stored context of the terminal and the notification received in step 1009, that the slice 3 is currently in the "available state" in the TA 3 to the TA 13, and the registration area of the terminal includes the TA 4 to the TA 6. Therefore, the terminal can use the slice 3. Therefore, for this example, the determined new allowed NSSAI includes {NSSAI 1, NSSAI 2, NSSAI 3}.

For another example, for the second example in step 1008, the AMF determines, based on the stored context of the terminal and the notification received in step 1009, that the slice 3 is currently in the "available state" in the TA 3, TA 4, and TA 6 to the TA 13 and is in the "restricted state" in the TA 5, and the registration area of the terminal includes the TA 4 to the TA 6. Therefore, the terminal cannot use the slice 3. Therefore, for this example, new allowed NSSAI does not need to be determined for the terminal.

For another example, for the third example in step 1008, the AMF determines, based on the stored context of the terminal and the notification received in step 1009, that the slice 3 is currently in the "available state" in the TA 3 to the TA 8 and is in the "restricted state" in the TA 9 to the TA 13, and the registration area of the terminal includes the TA 4 to the TA 6. Therefore, the terminal can use the slice 3. Therefore, for this example, the determined new allowed NSSAI includes {S-NSSAI 1, S-NSSAI 2, S-NSSAI 3}.

For another example, for the fourth example in step 1008, the AMF determines, based on the stored context of the terminal and the notification received in step 1009, that the slice 3 is currently in the "available state" in the TA 3 to the TA 13, and the registration area of the terminal includes the TA 4 to the TA 6. Therefore, the terminal can use the slice 3. Therefore, for this example, the determined new allowed NSSAI includes {S-NSSAI 1, S-NSSAI 2, S-NSSAI 3}.

Step 1011: The AMF sends the new allowed NSSAI to the terminal.

In step 1011, the new allowed NSSAI may be sent to the terminal in a manner described in step 1007A or step 1007B.

Optionally, if the new allowed NSSAI includes a slice in the rejected NSSAI stored by the AMF, the AMF may further delete an identifier of the slice from the rejected NSSAI. For example, for the slice 3, after the S-NSSAI 3 is included in the new allowed NSSAI and sent to the terminal, the AMF may delete the identifier S-NSSAI 3 of the slice 3 from the rejected NSSAI.

Based on this embodiment, the AMF stores the rejected NSSAI in the context of the terminal. After the AMF receives a notification from the NSSF and learns that a slice in the rejected NSSAI becomes available to the terminal again, the AMF adds an identifier of the slice to the new allowed NSSAI, and sends the new allowed NSSAI to the terminal. In this way, the slice is re-enabled, and resource utilization may be improved.

FIG. 11 is a schematic diagram of another slice information update method, in accordance with some embodiments. For ease of description, the embodiment shown in FIG. 11 is described by using an example in the embodiment shown in FIG. 10.

The method includes the following steps.

Step 1101 to step 1109 are similar to step 1001 to step 1009 in the embodiment shown in FIG. 10. Refer to the foregoing descriptions.

It should be noted that in step 1106, the AMF may not need to store the determined rejected NSSAI.

Step 1110: The terminal sends a registration request message to the AMF. Correspondingly, the AMF may receive the registration request message.

The registration request message includes requested NSSAI. The requested NSSAI includes the S-NSSAI in the rejected NSSAI obtained by the terminal in step 1107A or step 1107B.

For example, an example used in step 1101 to step 1109 in the embodiment shown in FIG. 11 is the same as the example used in step 1001 to step 1009 in the embodiment shown in FIG. 10. To be specific, in step 1101 to step 1109, it is determined that a service status of the slice 3 in some or all TAs of the slice 3 is changed from the "restricted state" to the "available state", and in step 1007A or step 1007B, the AMF notifies the terminal by using the rejected NSSAI, to reject that the terminal accesses (or uses) the slice 3.

Before initiating step 1111, the terminal already knows that the slice 3 is a slice that was previously rejected by the network. In this embodiment, when the terminal initiates the request again, identification information of the slice that was rejected to be accessed, for example, the identification information of the slice 3, the S-NSSAI 3, is carried in the requested NSSAI.

In a specific implementation, the terminal does not move out of the registration area. After a timer for periodic registration update expires, the terminal initiates a periodic registration request message in the registration area, where the periodic registration request message carries the requested NSSAI and a registration type. The requested NSSAI includes the S-NSSAI in the rejected NSSAI obtained by the terminal in step 1107A or step 1107B, and the registration type indicates that the registration request is periodic registration update.

Step 1111: The AMF determines new allowed NSSAI for the terminal based on the requested NSSAI. For example, the requested NSSAI in step 1110 carries the identifier of the slice 3, the S-NSSAI 3. In this case, in step 1111, if the AMF determines that the terminal can currently use the slice 3, the AMF adds the S-NSSAI 3 to the new allowed NSSAI. Certainly, the new allowed NSSAI may further carry an identifier of another slice that can be used.

Step 1112: The AMF sends a registration accept message to the terminal, where the registration accept message carries the new allowed NSSAI.

A main difference between the embodiment shown in FIG. 11 and the embodiment shown in FIG. 10 lies in that in the embodiment shown in FIG. 11, the terminal adds the identifier of the previously rejected slice to the registration request message, and then the AMF determines whether the terminal can currently use the rejected slice. If the terminal can use the rejected slice, the identifier of the previously rejected slice is included in the new allowed NSSAI, and is sent to the terminal.

Based on this embodiment, the terminal adds an identifier of a temporarily rejected slice to the registration request message, so that when the slice is subsequently changed from temporarily unavailable to available, the AMF can update the new allowed NSSAI of the terminal in a timely manner.

Therefore, the present disclosure discloses a slice information update method, including:

receiving, by a mobility management network element, a notification message from a network slice selection network element, where the notification message includes identification information of a network slice and identification information of at least one tracking area, the network slice is available in the at least one tracking area, and the network slice was once unavailable in the at least one tracking area;

determining, by the mobility management network element, an updated set of allowed network slices, where the updated set of allowed network slices includes the identification information of the network slice, and a terminal is located in a registration area of the terminal and can access the network slice; and sending, by the mobility management network element, the updated set of allowed network slices to the terminal.

That the terminal can access the network slice means that the network slice is available in any tracking area in the registration area of the terminal.

In a possible implementation, the method further includes: if determining that the network slice is available in the registration area of the terminal, determining, by the mobility management network element, that the terminal can access the network slice.

In a possible implementation, the method further includes: before the receiving, by a mobility management network element, a notification message from a network slice selection network element, storing, by the mobility management network element, a set of rejected network slices of the terminal, where the set of rejected network slices includes the identification information of the network slice.

In a possible implementation, before the sending, by the mobility management network element, the updated set of allowed network slices to the terminal, the method further includes: receiving, by the mobility management network element, a registration request message from the terminal, where the registration request message includes the identification information of the network slice.

In a possible implementation, the sending, by the mobility management network element, the updated set of allowed network slices to the terminal specifically includes: sending, b the mobility management network element, a registration accept message to the terminal, where the registration accept message includes the updated set of allowed network slices.

In the slice information update method, for operations of the mobility management network element, refer to the operations of the AMF in FIG. 10 or FIG. 11 and the foregoing related text descriptions. Details are not described herein again.

The present disclosure further discloses a slice information update method, including:

receiving, by a terminal, a set of allowed network slices and a set of rejected network slices that are of the terminal and that are from a mobility management network element, where the set of rejected network slices includes identification information of a network slice, and the terminal is located in a registration area of the terminal;

sending, by the terminal, a registration request message to the mobility management network element, where the registration request message includes the identification information of the network slice; and receiving, by the terminal, an updated set of allowed network slices from the mobility management network element, where the updated set of allowed network slices includes the identification information of the network slice, the network slice is available in the registration area of the terminal, and the network slice was once unavailable in the registration area of the terminal.

In a possible implementation, the receiving, by the terminal, an updated set of allowed network slices from the mobility management network element specifically includes: receiving, by the terminal, a registration accept message from the mobility management network element, where the registration accept message includes the updated set of allowed network slices.

In the slice information update method, for operations of the terminal, refer to the operations of the terminal in FIG. FIG. 11 and the foregoing related text descriptions. Details are not described herein again.

The solutions provided in this application are described above mainly from a perspective of interaction between the network elements. It may be understood that, the network elements include corresponding hardware structures and/or software modules for performing the foregoing functions. A person skilled in the art should easily be aware that, in combination with the units and algorithm steps in the examples described in the embodiments disclosed in this specification, the present disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 12:
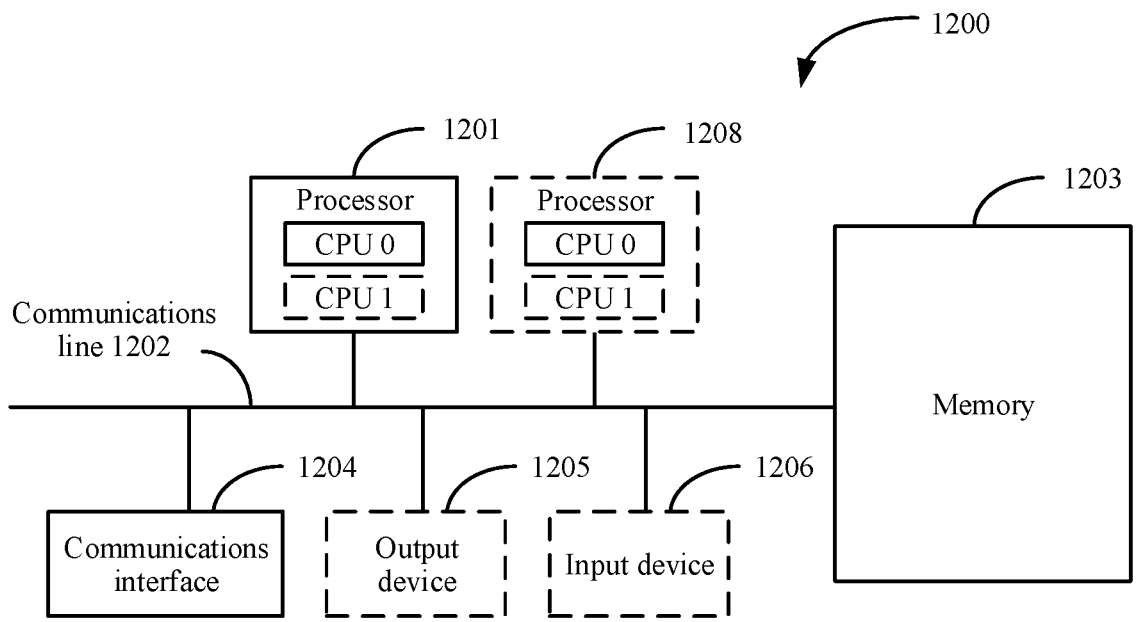
FIG. 12 is a schematic diagram of an apparatus, in accordance with some embodiments.

Based on a same inventive concept, FIG. 12 is a schematic diagram of an apparatus, in accordance with some embodiments. The apparatus may be a mobility management network element, a policy control network element, a network slice selection network element, a terminal, or a chip, and may perform the method in any one of the foregoing embodiments.

The apparatus 1200 includes at least one processor 1201, a communications line 1202, a memory 1203, and at least one communications interface 1204.

The processor 1201 may be a general-purpose central processing unit (CPU), a microprocessor, an application-specific integrated circuit (ASIC), or one or more integrated circuits configured to control program execution of the solutions of this application.

The communications line 1202 may include a path for transmitting information between the foregoing components.

The communications interface 1204 uses any apparatus such as a transceiver to communicate with another device or a communications network, such as the Ethernet, a radio access network (RAN), or a wireless local area network (WLAN).

The memory 1203 may be a read-only memory (read-only memory, ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto. The memory may exist independently and is connected to the processor through the communications line 1202. The memory may alternatively be integrated with the processor.

The memory 1203 is configured to store a computer-executable instruction for performing the solutions in this application, and execution of the computer executable instruction is controlled by the processor 1201. The processor 1201 is configured to execute the computer-executable instruction stored in the memory 1203, so as to implement a slice information update method provided in the following embodiments of this application.

Optionally, the computer-executable instruction in this embodiment of this application may also be referred to as application program code. This is not specifically limited in this embodiment of this application.

During specific implementation, in an embodiment, the processor 1201 may include one or more CPUs, for example, a CPU 0 and a CPU 1 in FIG. 12.

During specific implementation, in an embodiment, the apparatus 1200 may include a plurality of processors, for example, the processor 1201 and a processor 1208 in FIG. 12. Each of the processors may be a single-core (single-CPU) processor or a multi-core (multi-CPU) processor. The processor herein may refer to one or more devices, circuits, and/or processing cores configured to process data based on, e.g., a computer program instruction(s).

During specific implementation, in an embodiment, when the apparatus 1200 is a terminal, the apparatus 1200 may further include an output device 1205 and an input device 1206. The output device 1205 communicates with the processor 1201, and may display information in a plurality of manners. For example, the output device 705 may be a liquid crystal display (LCD), a light emitting diode (LED) display device, a cathode ray tube (CRT) display device, a projector, or the like. The input device 1206 communicates with the processor 1201, and may receive an input from a user in a plurality of manners. For example, the input device 1206 may be a mouse, a keyboard, a touchscreen device, or a sensing device.

When the apparatus shown in FIG. 12 is a chip, for example, may be a chip of a mobility management network element, a chip of a policy control network element, a chip of a network slice selection network element, or a chip of a terminal, the chip includes the processor 1201 (may further include the processor 1208), the communications line 1202, the memory 1203, and the communications interface 1204. Specifically, the communications interface 1204 may be an input interface, a pin, a circuit, or the like. The memory 1203 may be a register, a cache, or the like. The processor 1201 and the processor 1208 each may be a general-purpose CPU, a microprocessor, an ASIC, or one or more integrated circuits configured to control execution of a program of the slice information update method according to any one of the foregoing embodiments.

Figure 13:
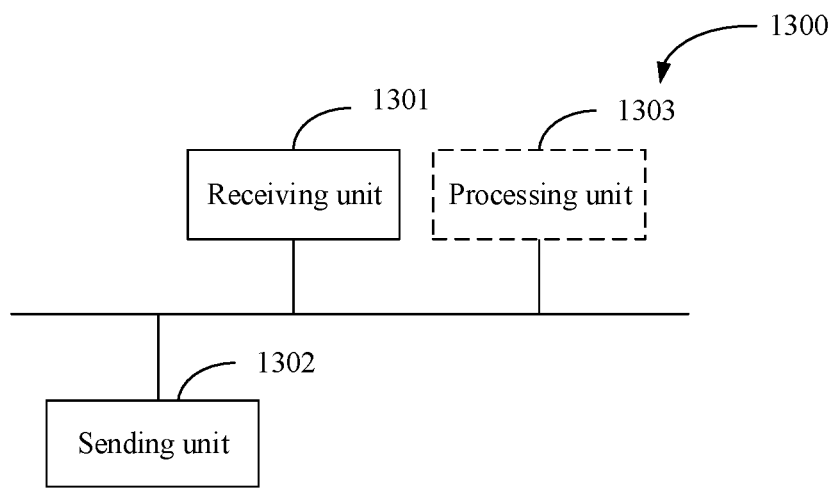
FIG. 13 is a schematic diagram of another apparatus, in accordance with some embodiments.

In this application, function modules in the apparatus may be obtained through division based on the foregoing method examples. For example, the function modules may be obtained through division based on corresponding functions, or two or more functions may be integrated into one processing module. The integrated module may be implemented in a form of hardware, or may be implemented in a form of a software function module. It should be noted that, in this application, division into the modules is an example, is merely a logical function division, and may be other division during actual implementation. For example, when the function modules are obtained through division based on the corresponding functions, FIG. 13 is a schematic diagram of an apparatus. The apparatus 1300 may be the communications network element or the chip of the communications network element in the foregoing embodiments, and the communications network element is a mobility management network element or a policy control network element. The apparatus 1300 includes a receiving unit 1301 and a sending unit 1302. Optionally, the apparatus 1300 further includes a processing unit 1303.

The receiving unit 1301 is configured to receive a notification message from a network slice selection network element, where the notification message includes identification information of a network slice, and the notification message is used to indicate that a public land mobile network PLMN supports the network slice. The PLMN once did not support the network slice. The sending unit 1302 is configured to notify the terminal that the PLMN supports the network slice, where the terminal is a terminal that failed to request the network slice and has subscribed to the network slice.

Optionally, the processing unit 1303 is configured to determine the terminal based on a context of the terminal.

In an implementation, if the apparatus is a mobility management network element or a chip of a mobility management network element, the processing unit 1303 is further configured to add the identification information of the network slice to a set of allowed network slices of the terminal; and the sending unit 1302 is specifically configured to send updated set of allowed network slices to the terminal.

Further, the sending unit 1302 is further configured to send indication information to the terminal, where the indication information is used to indicate that the PLMN supports the network slice.

Further, the processing unit 1303 is configured to add the identification information of the network slice to the set of allowed network slices of the terminal. The sending unit 1302 is specifically configured to send a configuration update message to the terminal, where the configuration update message includes the updated set of allowed network slices. Optionally, the configuration update message further includes the indication information.

In another implementation, if the apparatus is a policy control network element or a chip of a policy control network element, the processing unit 1303 is further configured to determine a mobility management network element with which the terminal registers; and the sending unit 1302 is specifically configured to send indication information to the terminal by using the mobility management network element, where the indication information is used to indicate that the PLMN supports the network slice.

Further, the receiving unit 1301 is further configured to receive the identification information of the network slice, identification information of the mobility management network element, and identification information of the terminal that are sent by the mobility management network element.

It should be understood that the apparatus may be configured to implement the steps that are performed by the AMF in the embodiment shown in FIG. 5 or performed by the PCFs in the embodiments shown in FIG. 6 and FIG. 7 and that are in the methods in the embodiments of the present disclosure. For related features, refer to the foregoing descriptions. Details are not described herein again.

Specifically, functions/implementation processes of the receiving unit 1301, the sending unit 1302, and the processing unit 1303 in FIG. 13 may be implemented by the processor 1201 in FIG. 12 by invoking a computer execution instruction stored in the memory 1203. Alternatively, a function/an implementation process of the processing unit 1303 in FIG. 13 may be implemented by the processor 1201 in FIG. 12 by invoking a computer-executable instruction stored in the memory 1203, and functions/implementation processes of the receiving unit 1301 and the sending unit 1302 in FIG. 13 may be implemented by using the communications interface 1204 in FIG. 12.

Optionally, when the apparatus 1300 is a chip, the functions/implementation processes of the receiving unit 1301 and the sending unit 1302 may alternatively be implemented by a pin, a circuit, or the like. Optionally, when the apparatus 1300 is a chip, the memory 1203 may be a storage unit in the chip, for example, a register or a cache. Certainly, when the apparatus 1300 is a communications network element, the memory 1203 may be a storage unit that is located outside a chip and that is in the communications network element. This is not specifically limited in the embodiments of this application.

Figure 14:
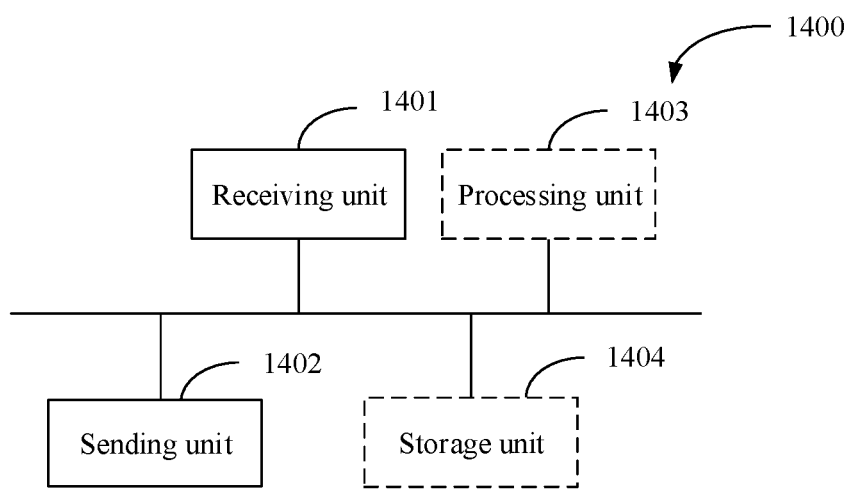
FIG. 14 is a schematic diagram of another apparatus, in accordance with some embodiments.

In this application, function modules in the apparatus may be obtained through division based on the foregoing method examples. For example, the function modules may be obtained through division based on corresponding functions, or two or more functions may be integrated into one processing module. The integrated module may be implemented in a form of hardware, or may be implemented in a form of a software function module. It should be noted that, in this application, division into the modules is an example, is merely a logical function division, and may be other division during actual implementation. For example, when the function modules are obtained through division based on the corresponding functions, FIG. 14 is a schematic diagram of an apparatus. The apparatus 1400 may be the mobility management network element or the chip of the mobility management network element in the foregoing embodiments. The apparatus 1400 includes a receiving unit 1401 and a sending unit 1402. Optionally, the apparatus 1400 further includes a processing unit 1403. Optionally, the apparatus 1400 further includes a storage unit 1404.

In a first embodiment, the receiving unit 1401 is configured to receive an update message from a policy control network element, where the update message includes indication information and identification information of a terminal, the indication information is used to indicate that a public land mobile network PLMN supports a network slice, and the PLMN once did not support the network slice. The sending unit 1402 is configured to notify the terminal that the PLMN supports the network slice, and the terminal is a terminal that failed to request the network slice and has subscribed to the network slice.

In a possible implementation, the processing unit 1403 is configured to add identification information of the network slice to a set of allowed network slices of the terminal. The sending unit 1402 is specifically configured to send updated set of allowed network slices to the terminal.

In a possible implementation, the sending unit 1402 is further configured to send indication information to the terminal, where the indication information is used to indicate that the PLMN supports the network slice.

In a possible implementation, the processing unit 1403 is configured to add the identification information of the network slice to the set of allowed network slices of the terminal. The sending unit 1402 is specifically configured to send a configuration update message to the terminal, where the configuration update message includes the updated set of allowed network slices. Optionally, the configuration update message further includes the indication information.

In a possible implementation, the sending unit 1402 is specifically configured to send a NAS message to the terminal, where the NAS message includes the indication information.

In a possible implementation, the sending unit 1402 is further configured to send the identification information of the terminal, identification information of the mobility management network element, and the identification information of the network slice to the policy control network element.

In a second embodiment, the receiving unit 1401 is configured to receive a notification message from a network slice selection network element, where the notification message includes identification information of a network slice and identification information of at least one tracking area, the network slice is available in the at least one tracking area, and the network slice was once unavailable in the at least one tracking area. The processing unit 1403 is configured to determine an updated set of allowed network slices, where the updated set of allowed network slices includes the identification information of the network slice, and the terminal is located in a registration area of the terminal and can access the network slice. The sending unit 1402 is configured to send the updated set of allowed network slices to the terminal.

In a possible implementation, the processing unit 1403 is further configured to: if determining that the network slice is available in the registration area of the terminal, determine that the terminal can access the network slice.

In a possible implementation, the storage unit 1404 is configured to: before the receiving unit 1401 receives the notification message from the network slice selection network element, store a set of rejected network slices of the terminal, where the set of rejected network slices includes the identification information of the network slice.

In a possible implementation, the receiving unit 1401 is further configured to: before the sending unit 1402 sends the updated set of allowed network slices to the terminal, receive a registration request message from the terminal, where the registration request message includes the identification information of the network slice.

In a possible implementation, the sending unit 1402 is specifically configured to send a registration accept message to the terminal, where the registration accept message includes the updated set of allowed network slices.

It should be understood that the apparatus may be configured to implement the steps that are performed by the AMFs in the embodiments shown in FIG. 6, FIG. 7, FIG. 10, and FIG. 11 and that are in the methods in the embodiments of the present disclosure. For related features, refer to the foregoing descriptions. Details are not described herein again.

Specifically, functions/implementation processes of the receiving unit 1401, the sending unit 1402, and the processing unit 1403 in FIG. 14 may be implemented by the processor 1201 in FIG. 12 by invoking a computer execution instruction stored in the memory 1203. Alternatively, a function/an implementation process of the processing unit 1403 in FIG. 14 may be implemented by the processor 1201 in FIG. 12 by invoking a computer-executable instruction stored in the memory 1203, and functions/implementation processes of the receiving unit 1401 and the sending unit 1402 in FIG. 14 may be implemented by using the communications interface 1204 in FIG. 12.

Optionally, when the apparatus 1400 is a chip, the functions/implementation processes of the receiving unit 1401 and the sending unit 1402 may alternatively be implemented by a pin, a circuit, or the like. Optionally, when the apparatus 1400 is a chip, the memory 1203 may be a storage unit in the chip, for example, a register or a cache. Certainly, when the apparatus 1400 is a mobility management network element, the memory 1203 may be a storage unit that is outside a chip and that is in the mobility management network element. This is not specifically limited in this embodiment of this application.

Figure 15:
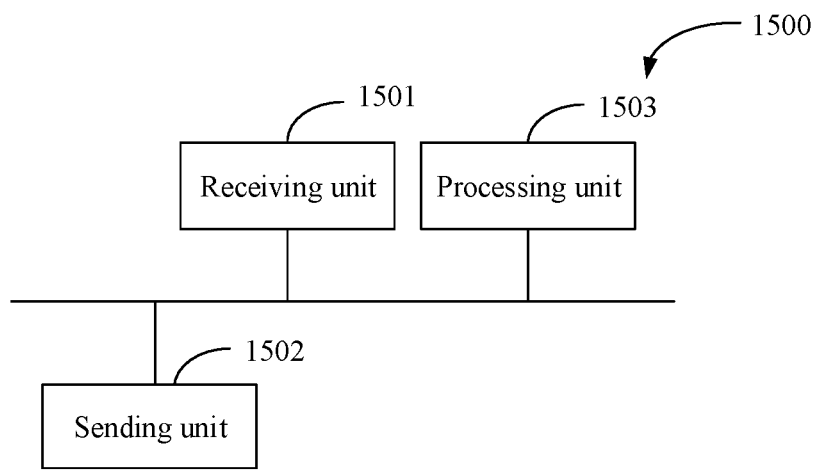
FIG. 15 is a schematic diagram of another apparatus, in accordance with some embodiments.

In this application, function modules in the apparatus may be obtained through division based on the foregoing method examples. For example, the function modules may be obtained through division based on corresponding functions, or two or more functions may be integrated into one processing module. The integrated module may be implemented in a form of hardware, or may be implemented in a form of a software function module. It should be noted that, in this application, division into the modules is an example, is merely a logical function division, and may be other division during actual implementation. For example, when the function modules are obtained through division based on the corresponding functions, FIG. 15 is a schematic diagram of an apparatus. The apparatus 1500 may be the policy control network element or the chip of the policy control network element in the foregoing embodiments. The apparatus 1500 includes a receiving unit 1501, a sending unit 1502, and a processing unit 1503.

The receiving unit 1501 is configured to receive identification information of a terminal and identification information of a network slice that are from a mobility management network element, where the network slice is a network slice that is not supported in a current registration area of the terminal.

The processing unit 1503 is configured to obtain, from a network slice selection network element, a service area corresponding to the network slice.

If the processing unit 1503 learns that the terminal moves to the service area, the sending unit 1502 notifies the terminal that the network slice is available.

In a possible implementation, the sending unit 1502 is further configured to send, to the mobility management network element, a subscription that when a location of the terminal is updated, the mobility management network element sends an updated location of the terminal to the apparatus.

In a possible implementation, the sending unit 1502 is further configured to send indication information to the terminal by using the mobility management network element, where the indication information is used to indicate that the network slice is available.

It should be understood that the apparatus may be configured to implement the steps that are performed by the PCF in the embodiment shown in FIG. 8 and that are in the methods in the embodiments of the present disclosure. For related features, refer to the foregoing descriptions. Details are not described herein again.

Specifically, functions/implementation processes of the receiving unit 1501, the sending unit 1502, and the processing unit 1503 in FIG. 15 may be implemented by the processor 1201 in FIG. 12 by invoking a computer execution instruction stored in the memory 1203. Alternatively, a function/an implementation process of the processing unit 1503 in FIG. 15 may be implemented by the processor 1201 in FIG. 12 by invoking a computer-executable instruction stored in the memory 1203, and functions/implementation processes of the receiving unit 1501 and the sending unit 1502 in FIG. 15 may be implemented by using the communications interface 1204 in FIG. 12.

Optionally, when the apparatus 1500 is a chip, the functions/implementation processes of the receiving unit 1501 and the sending unit 1502 may alternatively be implemented by a pin, a circuit, or the like. Optionally, when the apparatus 1500 is a chip, the memory 1203 may be a storage unit in the chip, for example, a register or a cache. Certainly, when the apparatus 1500 is a policy control network element, the memory 1203 may be a storage unit that is located outside a chip and that is in the policy control network element. This is not specifically limited in the embodiments of this application.

Figure 16:
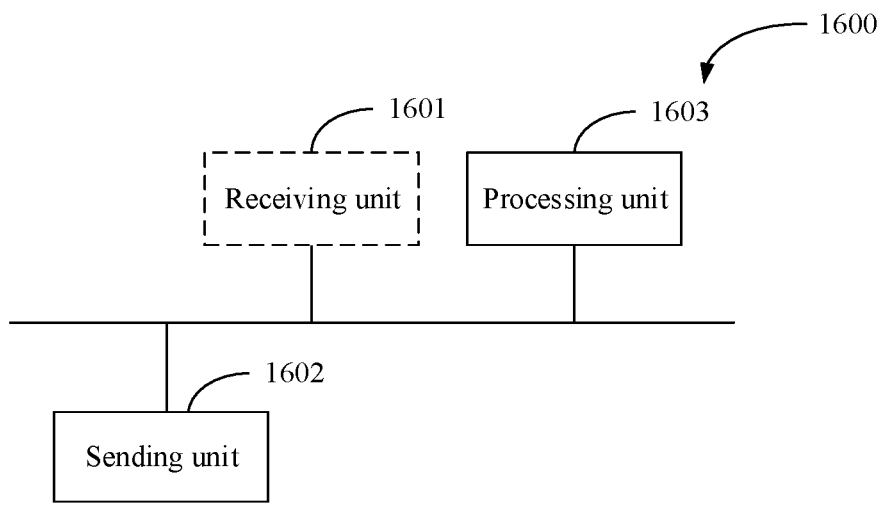
FIG. 16 is a schematic diagram of another apparatus, in accordance with some embodiments.

In this application, function modules in the apparatus may be obtained through division based on the foregoing method examples. For example, the function modules may be obtained through division based on corresponding functions, or two or more functions may be integrated into one processing module. The integrated module may be implemented in a form of hardware, or may be implemented in a form of a software function module. It should be noted that, in this application, division into the modules is an example, is merely a logical function division, and may be other division during actual implementation. For example, when the function modules are obtained through division based on the corresponding functions, FIG. 16 is a schematic diagram of an apparatus. The apparatus 1600 may be the network slice selection network element or the chip of the network slice selection network element in the foregoing embodiments. The apparatus 1600 includes a sending unit 1602 and a processing unit 1603. Optionally, the apparatus further includes a receiving unit 1601.

The processing unit 1603 is configured to determine that a public land mobile network PLMN supports a network slice, where the PLMN once did not support the network slice.

The sending unit 1602 is configured to send a notification message to a communications network element, where the notification message includes identification information of the network slice, and the notification message is used to indicate that the PLMN supports the network slice. The communications network element is a policy control network element or a mobility management network element.

In a possible implementation, the receiving unit 1601 is configured to receive, from the communications network element, a subscription that when the PLMN supports the network slice, the network slice selection network element notifies the communications network element.

In a possible implementation, the processing unit 1603 is further configured to: determine, based on a slice type supported by a mobility management network element in the PLMN, that the mobility management network element supporting the network slice is the communications network element. It should be understood that the apparatus may be configured to implement the steps that are performed by the NSSFs in the embodiments shown in FIG. 5 to FIG. 7 and that are in the methods in the embodiments of the present disclosure. For related features, refer to the foregoing descriptions. Details are not described herein again.

Specifically, functions/implementation processes of the receiving unit 1601, the sending unit 1602, and the processing unit 1603 in FIG. 16 may be implemented by the processor 1201 in FIG. 12 by invoking a computer execution instruction stored in the memory 1203. Alternatively, a function/an implementation process of the processing unit 1603 in FIG. 16 may be implemented by the processor 1201 in FIG. 12 by invoking a computer-executable instruction stored in the memory 1203, and functions/implementation processes of the receiving unit 1601 and the sending unit 1602 in FIG. 16 may be implemented by using the communications interface 1204 in FIG. 12.

Optionally, when the apparatus 1600 is a chip, the functions/implementation processes of the receiving unit 1601 and the sending unit 1602 may alternatively be implemented by a pin, a circuit, or the like. Optionally, when the apparatus 1600 is a chip, the memory 1203 may be a storage unit in the chip, for example, a register or a cache. Certainly, when the apparatus 1500 is a network slice selection network element, the memory 1203 may be a storage unit that is located outside a chip and that is in the network slice selection network element. This is not specifically limited in the embodiments of this application.

Figure 17:
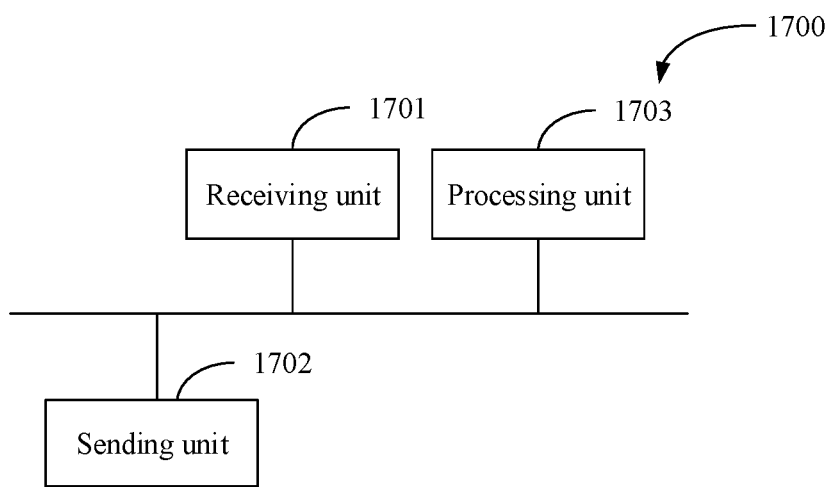
FIG. 17 is a schematic diagram of another apparatus, in accordance with some embodiments.

In this application, function modules in the apparatus may be obtained through division based on the foregoing method examples. For example, the function modules may be obtained through division based on corresponding functions, or two or more functions may be integrated into one processing module. The integrated module may be implemented in a form of hardware, or may be implemented in a form of a software function module. It should be noted that, in this application, division into the modules is an example, is merely a logical function division, and may be other division during actual implementation. For example, when the function modules are obtained through division based on the corresponding functions, FIG. 17 is a schematic diagram of an apparatus. The apparatus 1700 may be the terminal or the chip of the terminal in the foregoing embodiments. The apparatus 1700 includes a receiving unit 1701, a sending unit 1702, and a processing unit 1703.

The receiving unit 1701 is configured to receive a set of allowed network slices and a set of rejected network slices that are of the terminal and that are from a mobility management network element, where the set of rejected network slices includes identification information of a network slice, and the terminal is located in a registration area of the terminal. The sending unit 1702 is configured to send a registration request message to the mobility management network element, where the registration request message includes the identification information of the network slice. The receiving unit 1701 is further configured to receive an updated set of allowed network slices from the mobility management network element, where the updated set of allowed network slices includes the identification information of the network slice, the network slice is available in the registration area of the terminal, and the network slice was once unavailable in the registration area of the terminal.

In a possible implementation, the receiving unit 1701 is specifically configured to receive a registration accept message from the mobility management network element, where the registration accept message includes the updated set of allowed network slices.

It should be understood that the apparatus may be configured to implement the steps that are performed by the terminals in the embodiments shown in FIG. 10 and FIG. 11 and that are in the methods in the embodiments of the present disclosure. For related features, refer to the foregoing descriptions. Details are not described herein again.

Specifically, functions/implementation processes of the receiving unit 1701, the sending unit 1702, and the processing unit 1703 in FIG. 17 may be implemented by the processor 1201 in FIG. 12 by invoking a computer execution instruction stored in the memory 1203. Alternatively, a function/an implementation process of the processing unit 1703 in FIG. 17 may be implemented by the processor 1201 in FIG. 12 by invoking a computer-executable instruction stored in the memory 1203, and functions/implementation processes of the receiving unit 1701 and the sending unit 1702 in FIG. 17 may be implemented by using the communications interface 1204 in FIG. 12.

Optionally, when the apparatus 1700 is a chip, the functions/implementation processes of the receiving unit 1701 and the sending unit 1702 may alternatively be implemented by a pin, a circuit, or the like. Optionally, when the apparatus 1700 is a chip, the memory 1203 may be a storage unit in the chip, for example, a register or a cache. Certainly, when the apparatus 1500 is a terminal, the memory 1203 may be a storage unit that is located outside a chip and that is in the terminal. This is not specifically limited in the embodiments of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer program instructions. When the computer program instruction is loaded and executed on a computer, the procedure or functions according to the embodiments of the present disclosure are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by the computer, or a data storage device, such as a server or a data center, integrating one or more usable media. The usable medium may be a magnetic medium (e.g., a floppy disk, a hard disk, or a magnetic tape), an optical medium (e.g., a DVD), a semiconductor medium (e.g., a solid-state drive (Solid State Disk, SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

The steps of the methods or algorithms described in the embodiments of this application may be implemented by directly embedded hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor may read information from the storage medium and write information to the storage medium. Optionally, the storage medium may alternatively be integrated into a processor. The processor and the storage medium may be disposed in the ASIC, and the ASIC may be disposed in a terminal device. Optionally, the processor and the storage medium may alternatively be disposed in different components of the terminal device.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although the present disclosure is described with reference to specific features and the embodiments thereof, it is clear that various modifications and combinations may be made to them without departing from the spirit and scope of the present disclosure. Correspondingly, the specification and accompanying drawings are merely examples of the present disclosure defined by the accompanying claims, and are considered as any of or all modifications, variations, combinations or equivalents that cover the scope of the present disclosure. It is clear that a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A slice information update method, comprising:
sending, by a terminal, a registration request message to a mobility management network element, wherein the registration request message comprises network slice selection assistance information;
receiving, by the terminal responsive to the registration request message, information indicating a set of allowed network slices and a set of rejected network slices from the mobility management network element, wherein the set of rejected network slices comprises identification information of a network slice, and the terminal is located in a registration area;
receiving, by the terminal while still located in the registration area and prior to sending another registration request message to the mobility management network element, information indicating an updated set of allowed network slices from the mobility management network element, wherein the updated set of allowed network slices comprises the identification information of the network slice, the network slice is available in the registration area, and the network slice was unavailable in the registration area at a time when the registration accept message was received.

2. The method according to claim 1, wherein the receiving, by the terminal, the information indicating the updated set of allowed network slices from the mobility management network element comprises:
receiving, by the terminal, a configuration update message from the mobility management network element, wherein the configuration update message comprises the information indicating the updated set of allowed network slices.

3. The method of claim 1, wherein the information indicating the updated set of allowed network slices is received from a policy control network element.

4. The method of claim 3, wherein the policy control network element is configured to send a subscription request message to a network slice selection network element, wherein the subscription request message includes the identification information of the network slice.

5. The method of claim 4, wherein the policy control network element is further configured to receive a notification message from the network slice selection network element that indicates the network slice is available in a public land mobile network and, responsive to the notification message, transmit an update message to the mobility management network element.

6. The method of claim 5, wherein the mobility management network element is configured to transmit, responsive to receiving the update message from the policy control network element, a non-access stratum (NAS) message to the terminal that includes the information indicating the updated set of allowed network slices.

7. An apparatus, comprising:
a communications interface configured to receive a notification message from a network slice selection network element, wherein the notification message comprises identification information of a network slice and identification information of at least one tracking area, the network slice is available in the at least one tracking area, and the network slice was once unavailable in the at least one tracking area; and
a processor configured to determine an updated set of allowed network slices, wherein the updated set of allowed network slices comprises the identification information of the network slice,
wherein the communications interface is configured to, responsive to receiving the notification message, send a configuration update message comprising information indicating the updated set of allowed network slices to a terminal located in a registration area that can access the network slice,
wherein the communications interface received, prior to the notification message, a registration request message from the terminal and transmitted, responsive to the registration request message and at a time when the network slice was unavailable in the at least one tracking area, a registration accept message to the terminal that includes information indicating a set of allowed network slices and a set of rejected network slices to the terminal, the set of rejected network slices comprised the identification information of the network slice, and wherein the configuration update message is sent to the terminal prior to receiving another registration request message from the terminal.

8. The apparatus according to claim 7, wherein the processor is further configured to: responsive to determining that the network slice is available in the registration area, determine that the terminal can access the network slice.

9. The apparatus according to claim 7, wherein the apparatus further comprises a memory configured to:
before the communications interface receives the notification message from the network slice selection network element, store the set of rejected network slices of the terminal, wherein the set of rejected network slices comprises the identification information of the network slice.

10. The apparatus of claim 7, wherein the communications interface is further configured to transmit a subscription request message to the network slice selection network element, wherein the subscription request message includes the identification information of the network slice.

11. An apparatus, applied to a terminal, and comprising a transceiver, wherein
the transceiver is configured to:
send a registration request message to a mobility management network element, wherein the registration request message comprises network slice selection assistance information;
receive, from the mobility management network element responsive to the registration request message, a registration accept message including information indicating a set of allowed network slices and a set of rejected network slices, wherein the set of rejected network slices comprises identification information of a network slice, and the terminal is located in a registration area;
and
receive, while the terminal is still located in the registration area and prior to sending another registration request message to the mobility management network element, information indicating an updated set of allowed network slices from the mobility management network element, wherein the updated set of allowed network slices comprises the identification information of the network slice, the network slice is available in the registration area, and the network slice was unavailable in the registration area at a time when the registration accept message was received.

12. The apparatus according to claim 11, wherein the transceiver receives a configuration update message from the mobility management network element, wherein the configuration update message comprises the information indicating the updated set of allowed network slices.

* * * * *

UNITED STATES PATENT AND TRADEMARK OFFICE
CERTIFICATE OF CORRECTION

PATENT NO. : 11,425,634 B2
APPLICATION NO. : 16/905383
DATED : August 23, 2022
INVENTOR(S) : Zhu et al.

Page 1 of 1

It is certified that error appears in the above-identified patent and that said Letters Patent is hereby corrected as shown below:

On the Title Page

Other Publications, Column 2, Line 1: ""O1#4i, O1#4d/O1#32: Tailoring UE support and removing NSSP" should read -- Ol#4i, Ol#4d/Ol#32: Tailoring UE support and removing NSSP --.

Page 2: Other Publications, Column 1, Line 1: ""23.501 O1#4e: Clarification of slice availability in a PLMN," SA" should read -- "23.501 Ol#4e: Clarification of slice availability in a PLMN," SA --.

In the Claims

Claim 1: Column 50, Line 32: "terminal is located in a registration area;" should read -- terminal is located in a registration area; and --.

Signed and Sealed this
Third Day of January, 2023

Katherine Kelly Vidal
*Director of the United States Patent and Trademark Office*